(12) United States Patent
Atobe

(10) Patent No.: US 11,748,523 B2
(45) Date of Patent: Sep. 5, 2023

(54) UNAUTHORIZED CONNECTION DETECTION APPARATUS, UNAUTHORIZED CONNECTION DETECTION METHOD, AND NON-TRANSITORY COMPUTER-READABLE MEDIUM

(71) Applicant: Mitsubishi Electric Corporation, Tokyo (JP)

(72) Inventor: Yuta Atobe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 391 days.

(21) Appl. No.: 16/634,646

(22) PCT Filed: Sep. 7, 2017

(86) PCT No.: PCT/JP2017/032356
§ 371 (c)(1),
(2) Date: Jan. 28, 2020

(87) PCT Pub. No.: WO2019/049285
PCT Pub. Date: Mar. 14, 2019

(65) Prior Publication Data
US 2021/0097210 A1 Apr. 1, 2021

(51) Int. Cl.
*G06F 21/71* (2013.01)
*G06F 21/75* (2013.01)
(Continued)

(52) U.S. Cl.
CPC .......... *G06F 21/85* (2013.01); *G06F 11/3058* (2013.01); *G06F 21/71* (2013.01);
(Continued)

(58) Field of Classification Search
CPC ...... G06F 21/85; G06F 21/71; G06F 11/3058; H04L 12/40013; H04L 12/40; H04L 2012/40273
See application file for complete search history.

(56) References Cited

U.S. PATENT DOCUMENTS

| 7,863,769 B2 * | 1/2011 | Busdiecker | H02J 1/14 307/10.1 |
|---|---|---|---|
| 8,516,410 B2 * | 8/2013 | Nahmanny | G06F 30/36 716/136 |

(Continued)

FOREIGN PATENT DOCUMENTS

| CN | 102629409 A | 8/2012 |
|---|---|---|
| CN | 105940310 A | 9/2016 |

(Continued)

OTHER PUBLICATIONS

"Secure Communication over CAN Bus" Siddiqui et al, University of North Carolina, University of New Mexico, https://ece-research.unm.edu/jimp/pubs/AsianHOST2017.pdf (Year: 2017).*

(Continued)

*Primary Examiner* — Randy A Scott
(74) *Attorney, Agent, or Firm* — Sughrue Mion, PLLC; Richard C. Turner

(57) ABSTRACT

An unauthorized connection detection apparatus includes: a connected device count determination unit that determines the number of devices connected to a bus line on the basis of a measured waveform that is a voltage fluctuation waveform representing a change over time in a voltage value of the bus line or an impedance fluctuation waveform representing a change over time in an impedance value of the bus line; and an unauthorized connection determination unit that determines whether or not an unauthorized device is connected to the bus line on the basis of: a result of the determination of the number of devices by the connected (Continued)

device count determination unit; and information indicating the number of valid devices connected to the bus line.

16 Claims, 16 Drawing Sheets

(51) Int. Cl.
  *G06F 11/30* (2006.01)
  *H04L 12/40* (2006.01)
  *G06F 21/85* (2013.01)

(52) U.S. Cl.
  CPC .......... *H04L 12/40013* (2013.01); *H04L 2012/40273* (2013.01)

(56) References Cited

U.S. PATENT DOCUMENTS

| | | | |
|---|---|---|---|
| 2006/0164998 A1* | 7/2006 | Pham | H04L 63/1441 370/241 |
| 2010/0157729 A1* | 6/2010 | Richman | G01V 1/001 367/38 |
| 2010/0194528 A1* | 8/2010 | Yamaguchi | G06F 21/629 340/5.8 |
| 2013/0227650 A1 | 8/2013 | Miyake | |
| 2016/0291077 A1 | 10/2016 | Chen et al. | |

FOREIGN PATENT DOCUMENTS

| | | | |
|---|---|---|---|
| JP | 2007-036512 A | | 2/2007 |
| JP | 2007036512 A | * | 2/2007 |
| JP | 2012-104049 A | | 5/2012 |
| JP | 2012-164122 A | | 8/2012 |
| JP | 2012164122 A | * | 8/2012 |
| JP | 2016-075589 A | | 5/2016 |
| JP | 2016-538541 A | | 12/2016 |
| WO | 2015/071232 A2 | | 5/2015 |

OTHER PUBLICATIONS

"Hacking the CAN Bus: Basic Manipulation of a Modern Automobile Through CAN Bus Reverse Engineering"—Roderick Currie, GIAC, May 18, 2017 https://www.giac.org/paper/gcia/9927/hacking-bus-basic-manipulation-modern-automobile-bus-reverse-engineering/133228 (Year: 2017).*
International Search Report for PCT/JP2017/032356 dated Dec. 5, 2017 [PCT/ISA/210].
Written Opinion for PCT/JP2017/032356 dated Dec. 5, 2017 [PCT/ISA/237].
Notification of Reason for Refusal issued in the corresponding Japan Application No. 2018-561764 dated Apr. 24, 2018.
Office Action dated May 26, 2021 from the China National Intellectual Property Administration in CN Application No. 201780094489.5.

* cited by examiner

| AREA OF WAVEFORM | NUMBER OF DEVICES CONNECTED |
|---|---|
| (A−Z∗P)<S≤A | 0 |
| (A−2∗Z∗P)<S≤(A−Z∗P) | 1 |
| (A−3∗Z∗P)<S≤(A−2∗Z∗P) | 2 |
| ... | 3 |
| ... | 4 |
| ... | 5 |

A: REFERENCE AREA
P: VARIATION PARAMETER (0<P≤1)

FIG.15

CONNECTED DEVICE CHARACTERISTIC TABLE

| ID | CHARACTERISTIC (SUCH AS CAPACITANCE) |
|---|---|
| 1 | X1 |
| 2 | X2 |
| 3 | X3 |

↓

REFERENCE TABLE DERIVATION PROCESSING $$Z = \frac{1}{n} \times \sum_{i}^{n} X_i \times Y_i \times R_a$$

$Y_i$: INFLUENCE COEFFICIENT OF i-TH DEVICE CONNECTED
$R_a$: AREA CORRESPONDING TO CHARACTERISTIC
$n$: NUMBER OF VALID DEVICES CONNECTED

↓

| AREA OF WAVEFORM | NUMBER OF DEVICES CONNECTED |
|---|---|
| $(A - Z*P) < S \leq A$ | 0 |
| $(A - 2*Z*P) < S \leq (A - Z*P)$ | 1 |
| $(A - 3*Z*P) < S \leq (A - 2*Z*P)$ | 2 |
| $(A - 4*Z*P) < S \leq (A - 3*Z*P)$ | 3 |

UNAUTHORIZED CONNECTION DETECTION APPARATUS, UNAUTHORIZED CONNECTION DETECTION METHOD, AND NON-TRANSITORY COMPUTER-READABLE MEDIUM

CROSS REFERENCE TO RELATED APPLICATIONS

This application is a National Stage of International Application No. PCT/JP2017/032356 filed Sep. 7, 2017.

FIELD

The present invention relates to an unauthorized connection detection apparatus, an unauthorized connection detection method, and an information processing program for detecting an unauthorized connection of a device to a bus line.

BACKGROUND

In a network system where a plurality of devices is connected to a bus line to perform communication, a study of a technique for improving network security by detecting an unauthorized connection of a device has been conducted through the years (see, for example, Patent Literature 1).

Patent Literature 1 discloses an in-vehicle network system mounted on a vehicle such as a passenger vehicle, a truck, or a bus. The in-vehicle network system described in Patent Literature 1 performs authentication processing when a device is connected, thereby preventing an unexpected device from executing malicious processing such as unauthorized rewrite of a program for an electronic control unit (ECU) that controls a functional unit of the vehicle, or unauthorized acquisition of data from the ECU. Specifically, in the in-vehicle network system, an authentication server performs the authentication processing when a device is connected. When the ECU receives a program rewrite request or data acquisition request, the ECU inquires of the authentication server whether or not a device making that request is the device permitted by the authentication processing. The ECU then executes the requested processing if successfully confirming that the device making the request is the device permitted by the authentication processing.

CITATION LIST

Patent Literature

Patent Literature 1: Japanese Patent Application Laid-open No. 2012-104049

SUMMARY

Technical Problem

For the invention described in Patent Literature 1, when receiving the request such as rewrite of a program, the ECU that is an existing device connected to the in-vehicle network inquires of the authentication server, such that the ECU determines whether or not a device from which the request is transmitted is a valid device, that is, a device permitted to connect to the in-vehicle network. However, the ECU cannot determine whether or not a device that performs an unauthorized operation is connected, until the ECU actually communicates with the device performing an unauthorized operation and receives some request therefrom.

The present invention has been made in view of the above, and an object of the present invention is to provide an unauthorized connection detection apparatus capable of quickly detecting that a device not permitted to establish connection is connected to a network.

Solution to Problem

In order to solve the above problem and achieve the object, an unauthorized connection detection apparatus according to the present invention determines the number of devices connected to a bus line on the basis of a measured waveform that is a voltage fluctuation waveform representing a change over time in a voltage value of the bus line or an impedance fluctuation waveform representing a change over time in an impedance value of the bus line, and determines whether or not an unauthorized device is connected to the bus line on the basis of: a result of the determination of the number of devices; and information indicating the number of valid devices connected to the bus line.

Advantageous Effects of Invention

The unauthorized connection detection apparatus according to the present invention has an effect of being capable of quickly detecting that the device not permitted to establish connection is connected to the network.

BRIEF DESCRIPTION OF DRAWINGS

FIG. 15 is a diagram for explaining a method of creating the connected device count table illustrated in FIG. 14.

DESCRIPTION OF EMBODIMENTS

Hereinafter, an unauthorized connection detection apparatus, an unauthorized connection detection method, and an information processing program according to embodiments of the present invention will be described in detail with reference to the drawings. Note that the present invention is not limited to the embodiments.

First Embodiment

Figure 1:
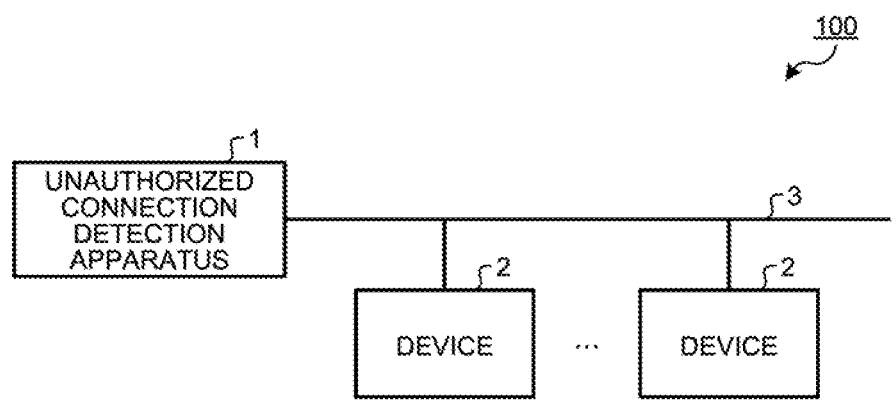
FIG. 1 is a diagram illustrating an example of a network system to which an unauthorized connection detection apparatus according to a first embodiment of the present invention is applied.

FIG. 1 is a diagram illustrating an example of a network system to which an unauthorized connection detection apparatus according to a first embodiment of the present invention is applied. A network system 100 includes an unauthorized connection detection apparatus 1 according to the first embodiment and one or more devices 2. The unauthorized connection detection apparatus 1 is implemented by an information processor. The unauthorized connection detection apparatus 1 and the devices 2, which are connected to a bus line 3, configure a bus network. The device 2 is a valid device that is permitted to connect to the bus line 3 and can communicate with the other devices 2 and the unauthorized connection detection apparatus 1 via the bus line 3. The bus network configured by the unauthorized connection detection apparatus 1 and the devices 2 corresponds to a Controller Area Network (CAN), Local Interconnect Network (LIN), or the like. Note that the network to which the unauthorized connection detection apparatus 1 according to the present invention is applied is not limited to the CAN and LIN. The unauthorized connection detection apparatus 1 according to the present invention can be applied to any bus network.

The unauthorized connection detection apparatus 1 uses a technique called time domain reflectometry (TDR) to determine whether or not an unauthorized device is connected to the bus line 3. Specifically, the unauthorized connection detection apparatus 1 first outputs a pulse signal or a step signal to the bus line 3 and observes its reflection characteristics. Next, the unauthorized connection detection apparatus 1 determines whether or not an unauthorized device is connected to the bus line 3 on the basis of a result of the observation of the reflection characteristics. The unauthorized device is an unexpected device that is not permitted to connect to the bus line 3 and may perform an unauthorized operation.

Figure 2:
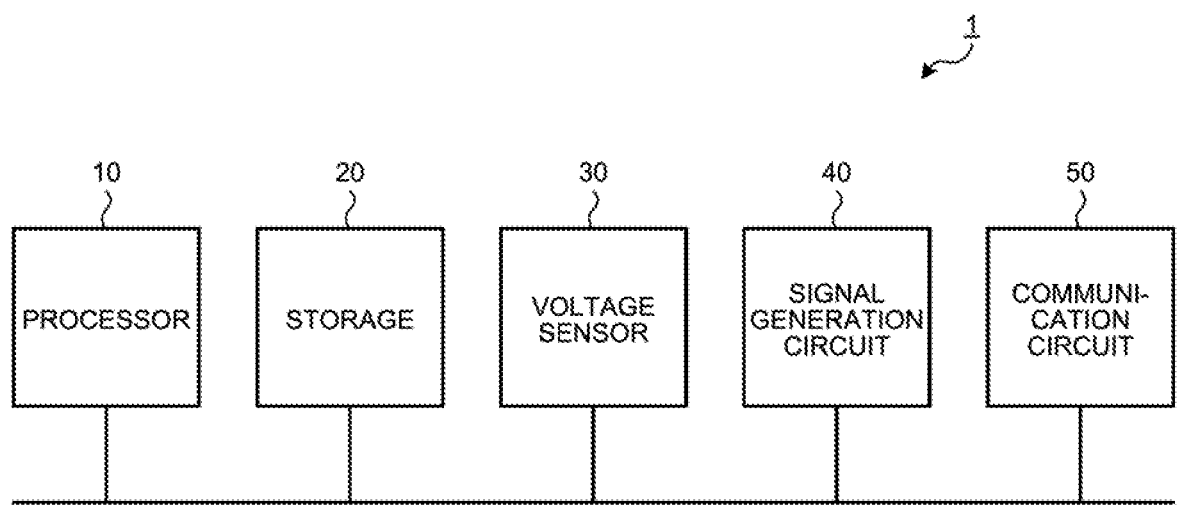
FIG. 2 is a diagram illustrating an example of hardware for implementing the unauthorized connection detection apparatus according to the first embodiment.
Figure 3:
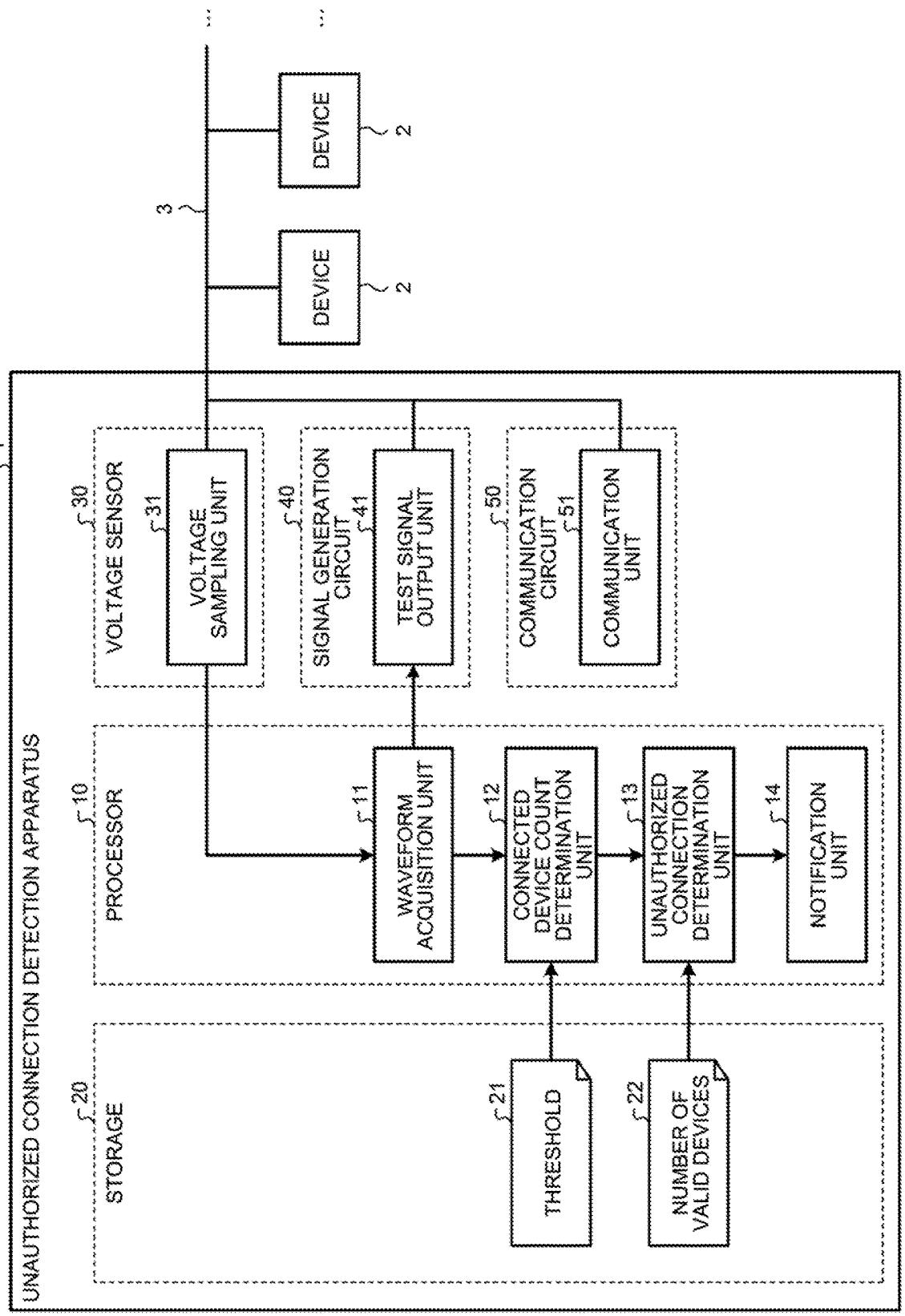
FIG. 3 is a diagram illustrating an example of a functional configuration block of the unauthorized connection detection apparatus according to the first embodiment.

FIG. 2 is a diagram illustrating an example of a hardware configuration of the information processor implementing the unauthorized connection detection apparatus 1 according to the first embodiment. FIG. 3 is a diagram illustrating an example of a functional configuration block of the unauthorized connection detection apparatus 1 according to the first embodiment.

As illustrated in FIG. 2, the information processor that implements the unauthorized connection detection apparatus 1 includes a processor 10, a storage 20, a voltage sensor 30, a signal generation circuit 40, and a communication circuit 50.

Also, as illustrated in FIG. 3, the unauthorized connection detection apparatus 1 includes a waveform acquisition unit 11, a connected device count determination unit 12, an unauthorized connection determination unit 13, and a notification unit 14 that are implemented by the processor 10. The unauthorized connection detection apparatus 1 also includes a voltage sampling unit 31 implemented by the voltage sensor 30. The unauthorized connection detection apparatus 1 further includes a test signal output unit 41 implemented by the signal generation circuit 40. The unauthorized connection detection apparatus 1 still further includes a communication unit 51 implemented by the communication circuit 50.

The processor 10 illustrated in FIG. 2 can be a central processing unit (CPU), a system large scale integration (LSI), or the like, the CPU being also referred to as a central processor, a processing unit, an arithmetic unit, a microprocessor, a microcomputer, a processor, or a digital signal processor (DSP). The storage 20 can be a random access memory (RAM), a read only memory (ROM), a flash memory, an erasable programmable read only memory (EPROM), an electrically erasable programmable read only memory (EEPROM (registered trademark)), or the like. The storage 20 holds a program executed by the processor 10, and various data. The program held in the storage 20 and executed by the processor 10 is an information processing program for allowing the processor 10 to operate as the waveform acquisition unit 11, the connected device count determination unit 12, the unauthorized connection determination unit 13, and the notification unit 14. The data held in the storage 20 includes a threshold 21 and the number of valid devices 22 illustrated in FIG. 3.

The processor 10 operates as the waveform acquisition unit 11, the connected device count determination unit 12, the unauthorized connection determination unit 13, and the notification unit 14 by reading the information processing program stored in the storage 20 therefrom and executing the program.

Note that the waveform acquisition unit 11, the connected device count determination unit 12, the unauthorized connection determination unit 13, and the notification unit 14 are implemented by one processor in the example illustrated in FIG. 3, but may be implemented by a plurality of processors. For example, some of the waveform acquisition unit 11, the connected device count determination unit 12, the unauthorized connection determination unit 13, and the notification unit 14 may be implemented by a first processor, and the rest may be implemented by a second processor. Alternatively, the waveform acquisition unit 11, the connected device count determination unit 12, the unauthorized connection determination unit 13, and the notification unit 14 may be implemented by different processors. The waveform acquisition unit 11, the connected device count determination unit 12, the unauthorized connection determination unit 13, and the notification unit 14 may be implemented using a one-chip microcomputer in which the processor and a memory as the storage are mounted on a single integrated circuit (IC) chip.

The operations of the waveform acquisition unit 11, the connected device count determination unit 12, the unauthorized connection determination unit 13, the notification unit 14, the voltage sampling unit 31, the test signal output unit 41, and the communication unit 51 of the unauthorized connection detection apparatus 1 illustrated in FIG. 3 will be described.

On the basis of the voltage value of the bus line 3 measured by the voltage sampling unit 31, the waveform acquisition unit 11 generates a waveform representing a change over time in the voltage value of the bus line 3; and the waveform acquisition unit 11 outputs the waveform to the connected device count determination unit 12.

On the basis of the waveform representing the change over time in the voltage value of the bus line 3, the connected device count determination unit 12 determines the number of devices connected to the bus line 3; and the connected device count determination unit 12 outputs a result of the determination to the unauthorized connection determination unit 13.

On the basis of the number of devices connected to the bus line 3, the unauthorized connection determination unit 13 determines whether or not an unauthorized device is connected to the bus line 3; and the unauthorized connection determination unit 13 outputs a result of the determination to the notification unit 14.

The notification unit 14 notifies the result of the determination made by the unauthorized connection determination unit 13 to the outside. For example, the notification unit 14 provides notification to a user of the unauthorized connection detection apparatus 1 by causing a display device (not shown) to display the result of the determination made by the unauthorized connection determination unit 13, that is, whether or not an unauthorized device is connected to the bus line 3.

The voltage sampling unit 31 measures the voltage value of the bus line 3 and outputs a result of the measurement to the waveform acquisition unit 11. The voltage sampling unit 31 repeatedly measures the voltage value of the bus line 3 in a predetermined cycle.

The test signal output unit 41 generates a high-frequency pulse signal or step signal upon receiving an instruction from the waveform acquisition unit 11, and outputs the generated signal to the bus line 3 as a test signal.

The communication unit 51 transmits/receives information to/from the device 2 and another device. For example, the communication unit 51 acquires the number of valid devices 22 held in the storage 20, from an authentication device (not shown) that executes authentication processing for determining whether or not the device 2 is a valid device permitted to connect to the bus line 3. The number of valid devices 22 is information indicating the number of valid devices connected to the bus line 3. When the number of valid devices 22 indicates "5", for example, five valid devices are connected to the bus line 3.

Figure 4:
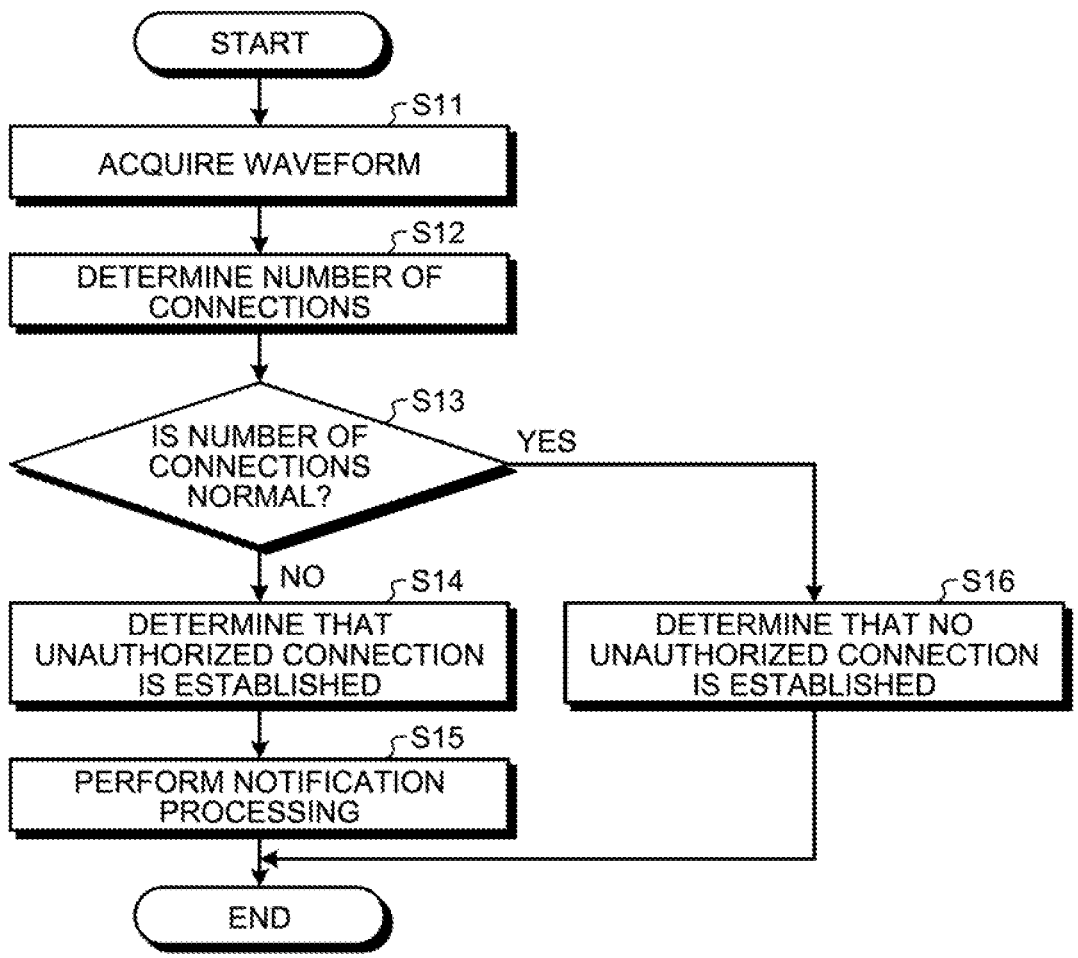
FIG. 4 is a flowchart illustrating an example of the operation of the unauthorized connection detection apparatus according to the first embodiment.

Next, an operation of the unauthorized connection detection apparatus 1, specifically, an operation for checking whether or not an unauthorized device is connected to the bus line 3, will be described with reference to FIGS. 3 and 4. FIG. 4 is a flowchart illustrating an example of the operation of the unauthorized connection detection apparatus 1 according to the first embodiment.

Figure 5:
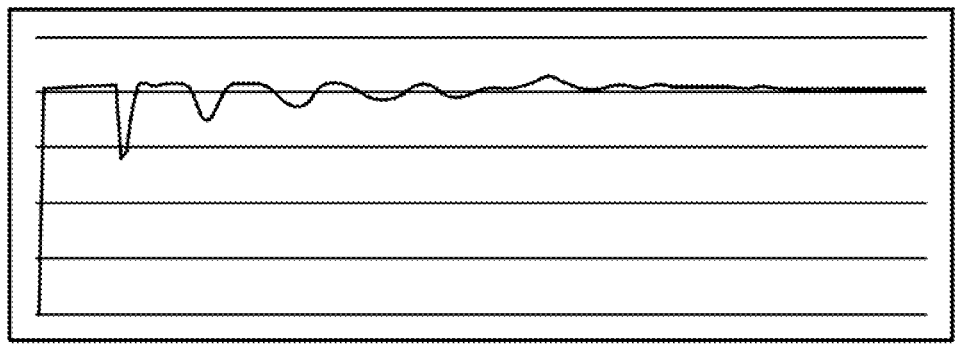
FIG. 5 is a diagram illustrating an example of a voltage fluctuation waveform acquired by a waveform acquisition unit according to the first embodiment.

The unauthorized connection detection apparatus 1 first acquires a waveform representing a change over time in the voltage of the bus line 3 (step S11). In step S11, the waveform acquisition unit 11 instructs the test signal output unit 41 to output a test signal to the bus line 3 when a predetermined condition is satisfied. At the same time, the waveform acquisition unit 11 acquires a sampling result provided by the voltage sampling unit 31, that is, the voltage value of the bus line 3, thereby generating a waveform representing a change over time in the voltage value acquired (hereinafter referred to as a voltage fluctuation waveform). The waveform acquisition unit 11 outputs the generated voltage fluctuation waveform to the connected device count determination unit 12. The waveform acquisition unit 11 generates the voltage fluctuation waveform by arranging, on a time axis, the voltage values that are received from the voltage sampling unit 31 until a predetermine time elapses since the test signal output unit 41 is instructed to output the test signal. When one or more of the devices 2 are connected to the bus line 3, an impedance mismatch occurs at points where the devices 2 are connected to the bus line 3 (these points are hereinafter referred to as connection points of the devices 2). As a result, signal reflection occurs at each connection point of the device 2, and the voltage value of the bus line 3 changes under the influence of the reflection at each connection point. For this reason, the voltage fluctuation waveform representing the change over time in the voltage value acquired by the waveform acquisition unit 11 is as illustrated in FIG. 5, for example. FIG. 5 is a diagram illustrating an example of the voltage fluctuation waveform acquired by the waveform acquisition unit 11 according to the first embodiment. In FIG. 5, the horizontal axis represents an elapsed time since the test signal output unit 41 outputs the test signal, and the vertical axis represents the voltage measured by the voltage sampling unit 31. When the test signal output unit 41 repeatedly outputs the test signal, the voltage fluctuation waveforms each corresponding one-to-one to the output test signal have similar waveforms if there is no change in the number of devices 2 connected to the bus line 3 and in the connection points of the devices 2. Note that when an unauthorized device other than the device 2 that is a valid device illustrated, for example, in FIG. 3 is connected to the bus line 3, an impedance mismatch similarly occurs at the point where the unauthorized device is connected to the bus line 3; as a result, the test signal is reflected. The processing of step S11 performed by the waveform acquisition unit 11 in cooperation with the test signal output unit 41 and the voltage sampling unit 31 is processing of observing the reflection characteristics of the bus line 3 and corresponds to processing of measuring the characteristics of the bus line 3 by TDR.

Figure 6:
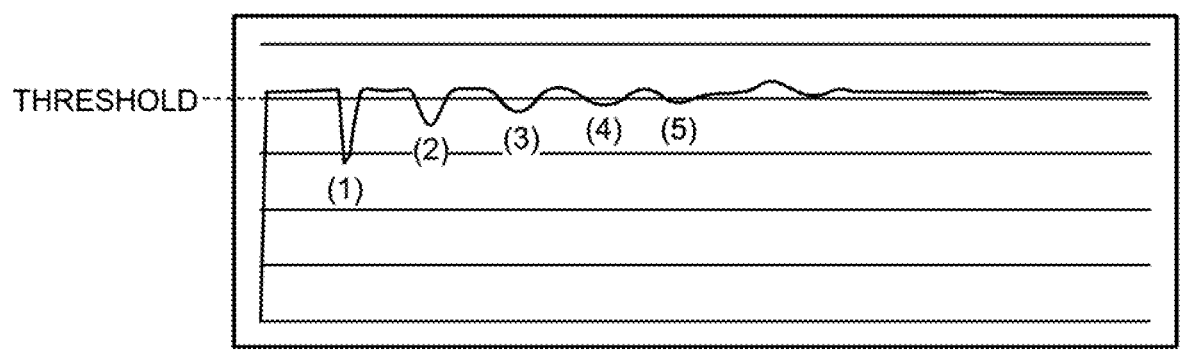
FIG. 6 is a diagram for explaining the operation of a connected device count determination unit according to the first embodiment.

Next, the unauthorized connection detection apparatus 1 determines the number of devices connected to the bus line 3 (step S12). In step S12, on the basis of the voltage fluctuation waveform input from the waveform acquisition unit 11, the connected device count determination unit 12 determines the number of devices connected to the bus line 3. The number of devices connected to the bus line 3, which is determined by the connected device count determination unit 12, is a sum of the number of valid devices, i.e, the devices 2 and the number of unauthorized devices other than the devices 2. Specifically, the connected device count determination unit 12 compares peak values included in the voltage fluctuation waveform with the threshold 21 stored in the storage 20, and detects a peak value exceeding the threshold 21. The connected device count determination unit 12 then determines the number of detected peak values as the number of devices connected to the bus line 3 (see FIG. 6). FIG. 6 is a diagram for explaining the operation of the connected device count determination unit 12 according to the first embodiment, where the diagram includes a threshold added to the voltage fluctuation waveform illustrated in FIG. 5. In the example of the voltage fluctuation waveform illustrated in FIG. 5, the voltage of the bus line 3 decreases when the test signal is reflected. Thus, the peak value exceeding the threshold 21 in this case is a peak value falling below the threshold 21. In another expression, the connected device count determination unit 12 determines, as the number of devices connected to the bus line 3, the number of occurrences of a phenomenon in which the magnitude relationship between the voltage value forming the voltage fluctuation waveform and the threshold is reversed and then reversed again to return to the original state. In the case of the example illustrated in FIG. 6, the number of peak values exceeding the threshold 21 is five, whereby the connected device count determination unit 12 determines that the number of devices connected to the bus line 3 is five. The connected device count determination unit 12 outputs the number of devices connected to the bus line 3 to the unauthorized connection determination unit 13.

Figure 7:
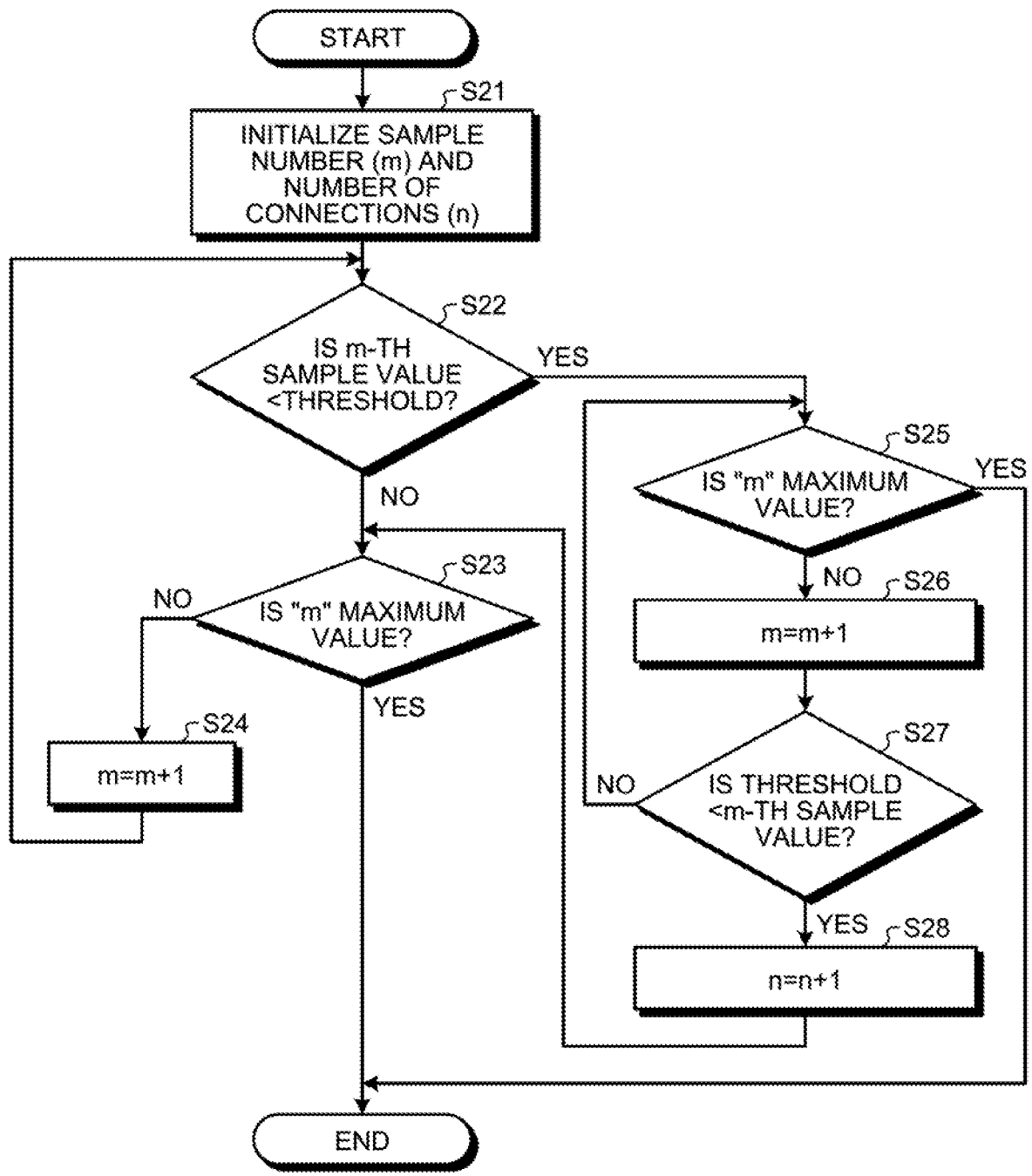
FIG. 7 is a flowchart illustrating an example of the operation of the connected device count determination unit according to the first embodiment.

By, for example, executing the operation according to a flowchart illustrated in FIG. 7, the connected device count determination unit 12 determines the number of devices connected to the bus line 3. FIG. 7 is the flowchart illustrating an example of the operation of the connected device count determination unit 12 according to the first embodiment, and illustrates an operation corresponding to the example illustrated in FIG. 6. The connected device count determination unit 12 starts the operation according to the flowchart illustrated in FIG. 7 once the voltage fluctuation waveform is input.

The connected device count determination unit 12 first initializes a sample number "m" and the number of connections "n" (step S21). The sample number is a number representing one of a plurality of voltage values forming the voltage fluctuation waveform. Note that the voltage value measured first among the plurality of voltage values has the smallest sample number, and the voltage value measured last has the largest sample number. Note that the voltage fluctuation waveform is formed of M voltage values (where M is a positive integer), and the M voltage values are assigned the sample numbers 1, 2, 3, . . . , and M. The number of connections is the number of devices connected to the bus line 3. In this case, the connected device count determination unit 12 sets m=1 and n=0 in step S21.

Next, the connected device count determination unit 12 checks whether or not an m-th sample value, which is the voltage value with the sample number "m", is less than the threshold 21 (step S22). If the m-th sample value is greater than or equal to the threshold 21 (No in step S22), the connected device count determination unit 12 checks whether or not "m" is the maximum value, that is, whether or not m=M (step S23). If "m" is not the maximum value (No in step S23), the connected device count determination unit 12 adds one to "m" (step S24), returns to step S22, and continues the operation.

On the other hand, if the m-th sample value is less than the threshold 21 (Yes in step S22), the connected device count determination unit 12 checks whether or not "m" is the maximum value (step S25). If "m" is not the maximum value (No in step S25), the connected device count determination unit 12 adds one to "m" (step S26) and checks whether or not the m-th sample value is greater than the threshold 21 (step S27). If the m-th sample value is less than or equal to the threshold 21 (No in step S27), the connected device count determination unit 12 returns to step S25 and continues the operation. If the m-th sample value is greater than the threshold 21 (Yes in step S27), the connected device count determination unit 12 adds one to "n" (step S28), returns to step S23, and continues the operation. The connected device count determination unit 12 ends the operation if determining that "m" is the maximum value (Yes in step S23 or Yes in step S25). The connected device count determination unit 12 determines that the value of "n" at the time of ending the operation illustrated in FIG. 7, that is, at the time of determining that "m" is the maximum value is the number of devices connected to the bus line 3.

Note that in the examples illustrated in FIGS. 6 and 7, the threshold 21 used for comparison with the voltage value forming the voltage fluctuation waveform is a constant or fixed value. However, as illustrated in FIGS. 5 and 6, the peak values appearing in the voltage fluctuation waveform are not constant, where the peak value that appears first has the largest absolute value, and an absolute value of each peak value detected is smaller than an absolute value of the peak value detected earlier. For this reason, the threshold 21 used for detection of the peak value may be variable. Specifically, each time the peak value is detected, the threshold 21 used for detection of the next peak value may be changed. Changing the threshold 21 in accordance with the peak value to be detected allows an expected peak value to be detected using the threshold 21 having an appropriate value. As a result, the accuracy of detecting the peak value, that is, the accuracy of detecting the number of devices connected to the bus line 3, can be improved. The example illustrated in FIG. 6 uses the threshold 21 that can detect the peak value having the smallest absolute value, in which case the possibility of false detection of the peak value increases. On the other hand, when the threshold 21 is variable, the possibility of false detection of the peak value can be decreased. When the threshold 21 is variable, the connected device count determination unit 12, for example, executes step S28 illustrated in FIG. 7 to increase the number of connections "n" by one, after which the connected device count determination unit 12 changes the threshold 21 used in the processing of steps S22 and S27.

Turning back to the explanation of FIG. 4, the unauthorized connection detection apparatus 1 next determines whether or not the number of devices connected to the bus line 3 is normal (step S13). In step S13, the unauthorized connection determination unit 13 checks whether or not the number of devices connected to the bus line 3, which is input from the connected device count determination unit 12, matches the number of valid devices 22 stored in the storage 20. The unauthorized connection determination unit 13 determines that the number of devices connected is normal if the number of devices connected to the bus line 3 matches the number of valid devices 22, or determines that the number of devices connected is abnormal if the number of devices connected to the bus line 3 does not match the number of valid devices 22.

If the number of devices connected to the bus line 3 is normal (Yes in step S13), the unauthorized connection detection apparatus 1 ends the processing, determining that there is no unauthorized connection, that is, an unauthorized device is not connected to the bus line 3 (step S16).

If the number of devices connected to the bus line 3 is abnormal (No in step S13), the unauthorized connection detection apparatus 1 determines that an unauthorized connection is established, that is, an unauthorized device is connected to the bus line 3 (step S14), and subsequently executes notification processing (step S15). In step S15, the notification unit 14 provides notification to a user of the unauthorized connection detection apparatus 1 or the like by, for example, displaying on the display device that an unauthorized device is connected to the bus line 3. Note that when an unauthorized device is connected to the bus line 3, the number of devices connected to the bus line 3 (the number of connections) is larger than the number of valid devices 22. On the other hand, the number of connections is also abnormal when the number of connections is smaller than the number of valid devices 22, in which case some or all of valid devices that should be normally connected to the bus line 3 are possibly unconnected to the bus line 3. Therefore, if the number of connections is smaller than the number of valid devices 22, the unauthorized connection detection apparatus 1 may perform an operation in step S15 to notify that a connection error has occurred in the device, provide notification that instructs checking of a connection state of the device, or the like. The notification processing is performed only when the number of devices connected to the bus line 3 is abnormal in the flowchart illustrated in FIG. 4, but the notification processing may also be performed when the number of devices connected to the bus line 3 is normal to notify that the number of connections is normal.

As described above, the unauthorized connection detection apparatus 1 according to the present embodiment outputs the high-frequency pulse signal or step signal being the test signal to the bus line 3, measures the voltage value of the bus line 3 at that time to generate the voltage fluctuation waveform representing a change over time in the voltage value of the bus line 3, and determines the number of devices connected to the bus line 3 on the basis of the generated voltage fluctuation waveform. Then, the unauthorized connection detection apparatus 1 compares the determined number of devices with the number of valid devices 22 held in advance and indicating the number of valid devices connected to the bus line 3, thereby determining whether or not an unauthorized device is connected to the bus line 3. The unauthorized connection detection apparatus 1 according to the present embodiment detects the connection of an unauthorized device on the basis of the voltage value of the bus line 3, and thus does not require processing such as communicating with another device when determining whether or not an unauthorized device is connected. Thus, the unauthorized connection detection apparatus 1 according to the present embodiment can quickly detect that a device not permitted to establish connection is connected to the bus line 3 while preventing an increase in the processing load.

The connected device count determination unit 12 of the present embodiment, which compares the voltage fluctuation waveform with the threshold to determine the number of devices connected to the bus line 3, can detect the timing at which reflection occurs on the bus line 3, that is, detect at what location on the bus line 3 the device is connected. For example, when performing the operation according to the flowchart illustrated in FIG. 7, the connected device count determination unit 12 can see that reflection has occurred in a range between the sample value that is less than the threshold and the sample value that is greater than the threshold if the connected device count determination unit 12 detects that the sample value is less than the threshold and then detecting that the sample value is greater than the threshold. For this reason, the unauthorized connection detection apparatus 1 may store the timing of the detection of each reflected wave when it is determined that the number of devices connected to the bus line 3 is normal. In this case, when determining that the number of devices connected to the bus line 3 is abnormal in a subsequent operation, the unauthorized connection detection apparatus 1 can detect at which position on the bus line 3 an unauthorized device is connected. That is, upon determining that the number of devices connected to the bus line 3 is abnormal, the unauthorized connection detection apparatus 1 compares the timing at which each reflected wave is generated at this time with the timing of the detection of each reflected wave stored when the number of devices connected to the bus line 3 is determined to be normal, such that the unauthorized connection detection apparatus 1 can recognize the timing at which reflection has occurred at the connection point of an unauthorized device, and calculate the connection position of the unauthorized device on the basis of this timing. In summary, when determining that an unauthorized device is not connected, the unauthorized connection detection apparatus 1 may store information on the timing at which reflection has occurred at the connection point of each device (valid device), and use this information to identify the connection position of an unauthorized device when detecting connection of the unauthorized device and notify the connection position of the unauthorized device to the outside. That is, the unauthorized connection detection apparatus 1 may provide notification of the connection position of an unauthorized device in addition to notification that an unauthorized device is connected, if the unauthorized connection detection apparatus 1 detects that the unauthorized device is connected to the bus line 3 while holding the information on the timing at which reflection occurs when an unauthorized device is not connected to the bus line 3.

The processing of identifying the connection position of an unauthorized device may be performed by the unauthorized connection determination unit 13 or the connected device count determination unit 12. Alternatively, a processing unit for identifying the connection position of an unauthorized device may be provided separately. Where the unauthorized connection determination unit 13 is configured to identify the connection position of an unauthorized device, for example, upon determining that the number of devices connected to the bus line 3 is normal, the unauthorized connection determination unit 13 instructs the connected device count determination unit 12 to write the information on the timing of detection of each reflected wave, into the storage 2. Following the instruction from the unauthorized connection determination unit 13, the connected device count determination unit 12 writes the information on the timing of detection of each reflected wave, into the storage 2. When the unauthorized connection determination unit 13 thereafter determines that the number of devices connected to the bus line 3 is abnormal, the unauthorized connection determination unit 13 acquires, from the unauthorized connection determination unit 13, information on the timing of detection of each reflected wave at this time, reads, from the storage 20, the information on the timing of detection of each reflected wave when the number of devices connected to the bus line 3 is normal, and identifies, on the basis of these pieces of information, the connection position of an unauthorized device.

Note that in the present embodiment, on the basis of the voltage fluctuation waveform and the threshold, the connected device count determination unit 12 determines the number of devices connected to the bus line 3; however, an impedance fluctuation waveform may be used instead of the voltage fluctuation waveform. The impedance fluctuation waveform is a waveform representing a change over time in the impedance of the bus line 3. The operation of the connected device count determination unit 12 when using the impedance fluctuation waveform is similar to the operation when using the voltage fluctuation waveform. That is, the connected device count determination unit 12 counts the number of peak values in the impedance fluctuation waveform exceeding a threshold, and determines a result of the count as the number of devices connected to the bus line 3. In this case, the waveform acquisition unit 11 converts the voltage value received from the voltage sampling unit 31 into an impedance value to generate the impedance fluctuation waveform.

Second Embodiment

Figure 8:
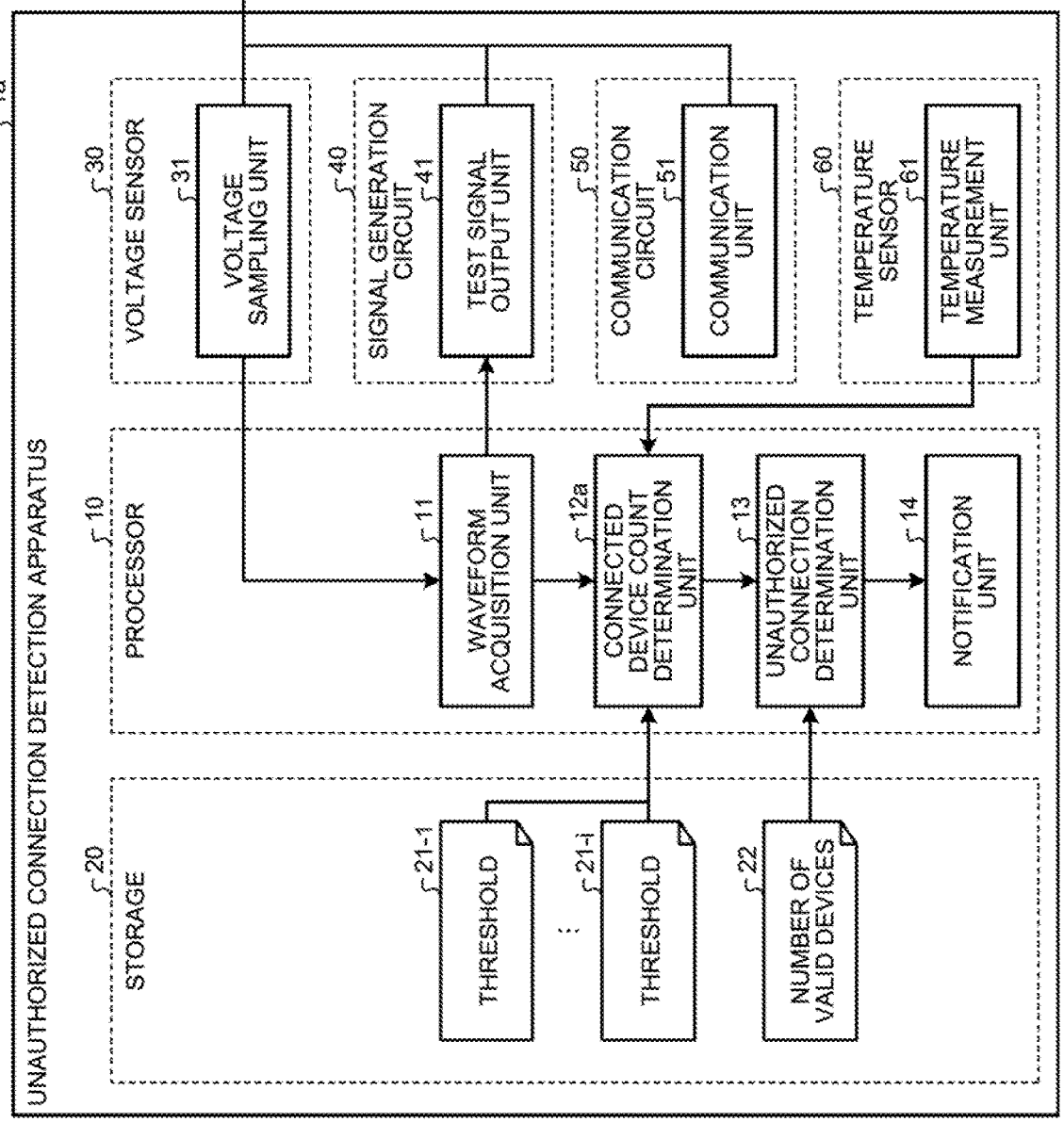
FIG. 8 is a diagram illustrating an example of a functional configuration block of an unauthorized connection detection apparatus according to a second embodiment.

FIG. 8 is a diagram illustrating an example of a functional configuration block of an unauthorized connection detection apparatus according to a second embodiment. An unauthorized connection detection apparatus 1a according to the second embodiment is obtained by adding a temperature measurement unit 61 to the unauthorized connection detection apparatus 1 according to the first embodiment, and replacing the connected device count determination unit 12 thereof with a connected device count determination unit 12a. Moreover, the unauthorized connection detection apparatus 1a holds a plurality of thresholds 21-1 to 21-i. Components other than the temperature measurement unit 61 and the connected device count determination unit 12a of the unauthorized connection detection apparatus 1a are the same as the components that are assigned the same reference numerals in the unauthorized connection detection apparatus 1 according to the first embodiment. Therefore, description of the components other than the temperature measurement unit 61 and the connected device count determination unit 12a is omitted.

The temperature measurement unit 61 is implemented by a temperature sensor 60. The temperature measurement unit 61 measures the temperature around the bus line 3 and outputs a result of the measurement to the connected device count determination unit 12a. The temperature measurement unit 61 repeatedly measures the temperature around the bus line 3 in a predetermined cycle. Note that the cycle in which the temperature measurement unit 61 measures the temperature may be different from or the same as the cycle in which the voltage sampling unit 31 measures the voltage value. Moreover, instead of repeatedly measuring the temperature, the temperature measurement unit 61 may measure the temperature when receiving an instruction from the connected device count determination unit 12a or the waveform acquisition unit 11.

The connected device count determination unit 12a performs similar processing to the connected device count determination unit 12 of the first embodiment, and determines the number of devices connected to the bus line 3. However, when determining the number of devices connected to the bus line 3 on the basis of the voltage fluctuation waveform received from the waveform acquisition unit 11, the connected device count determination unit 12a uses a threshold corresponding to the temperature around the bus line 3 measured by the temperature measurement unit 61. Even if there is no change in the number of devices connected to the bus line 3, a change in the temperature of the bus line 3 can change the voltage fluctuation waveform and change the peak value included in the voltage fluctuation waveform. For this reason, the plurality of types of thresholds 21-1 to 21-i is prepared in advance so that the unauthorized connection detection apparatus 1a uses the threshold corresponding to the temperature around the bus line 3 to determine the number of devices connected to the bus line 3.

The unauthorized connection detection apparatus 1a holds the plurality of types of thresholds such as a first threshold used when the temperature around the bus line 3 is 10° C. or lower, a second threshold used when the temperature around the bus line 3 is higher than 10° C. and 20° C. or lower, a third threshold used when the temperature around the bus line 3 is higher than 20° C. and 30° C. or lower, and a fourth threshold used when the temperature around the bus line 3 is higher than 30° C. The unauthorized connection detection apparatus 1a uses the first to fourth thresholds properly in accordance with the temperature around the bus line 3.

As described above, the unauthorized connection detection apparatus 1a according to the present embodiment monitors the temperature around the bus line 3, selects and uses the threshold corresponding to the temperature from among the plurality of thresholds, and determines the number of devices connected to the bus line 3. Thus, as compared with the unauthorized connection detection apparatus 1 of the first embodiment, the connection of a device possibly performing an unauthorized operation can be detected with higher accuracy.

Third Embodiment

Figure 9:
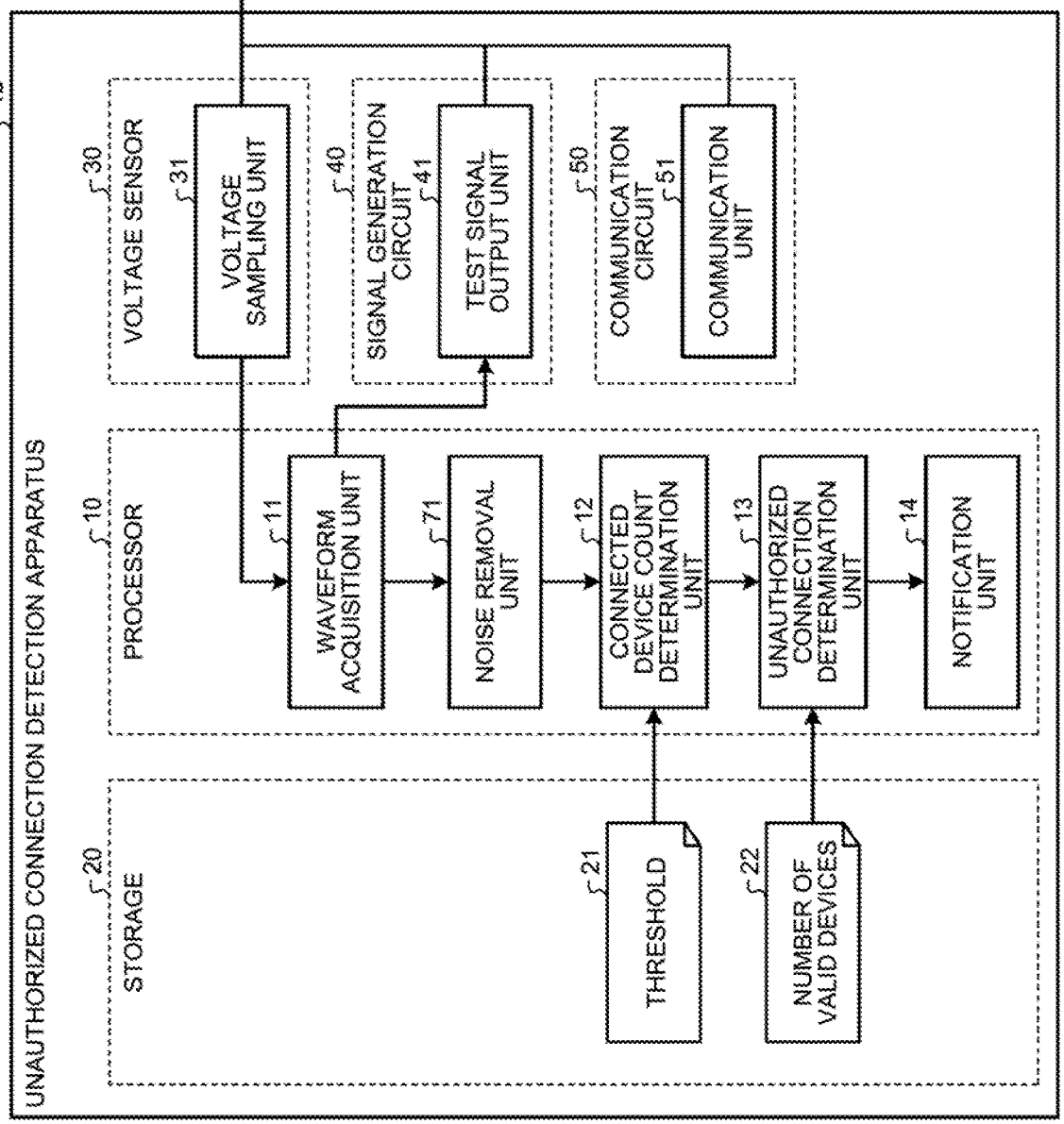
FIG. 9 is a diagram illustrating an example of a functional configuration block of an unauthorized connection detection apparatus according to a third embodiment.

FIG. 9 is a diagram illustrating an example of a functional configuration block of an unauthorized connection detection apparatus according to a third embodiment. An unauthorized connection detection apparatus 1b according to the third embodiment is obtained by adding a noise removal unit 71 to the unauthorized connection detection apparatus 1 according to the first embodiment. Components other than the noise removal unit 71 of the unauthorized connection detection apparatus 1b are the same as the components that are assigned the same reference numerals in the unauthorized connection detection apparatus 1 according to the first embodiment. Therefore, description of the components other than the noise removal unit 71 is omitted. Note that a value and a deviation value of a sample point used in the following description are for making the description of operation of the noise removal unit 71 easy to understand, and do not limit the operation of the noise removal unit 71.

The noise removal unit 71 is implemented by the processor 10. In other words, the noise removal unit 71 is implemented by the processor 10 reading, from the storage 20, a program for operating as the noise removal unit 71 and executing the program. The program for operating as the noise removal unit 71 may be included in the information processing program for operating as the waveform acquisition unit 11, the connected device count determination unit 12, the unauthorized connection determination unit 13, and the notification unit 14 as described in the first embodiment.

The noise removal unit 71 removes a noise component included in the voltage fluctuation waveform output from the waveform acquisition unit 11. The noise removal unit 71 outputs, to the connected device count determination unit 12, the voltage fluctuation waveform after removing the noise component therefrom. The connected device count determination unit 12 determines the number of devices connected to the bus line 3, on the basis of the voltage fluctuation waveform from which the noise component has been removed; thus, the connected device count determination unit 12 can improve the accuracy of the determination.

Examples of the operation in which the noise removal unit 71 removes the noise component from the voltage fluctuation waveform will be described. Note that the waveform acquisition unit 11 repeatedly executes the processing of generating the voltage fluctuation waveform and outputs a plurality of the voltage fluctuation waveforms to the noise removal unit 71.

First Example

The noise removal unit 71 averages the plurality of voltage fluctuation waveforms output from the waveform acquisition unit 11, and outputs the averaged voltage fluctuation waveform to the connected device count determination unit 12, as the voltage fluctuation waveform from which the noise component has been removed.

Second Example

Figure 10:
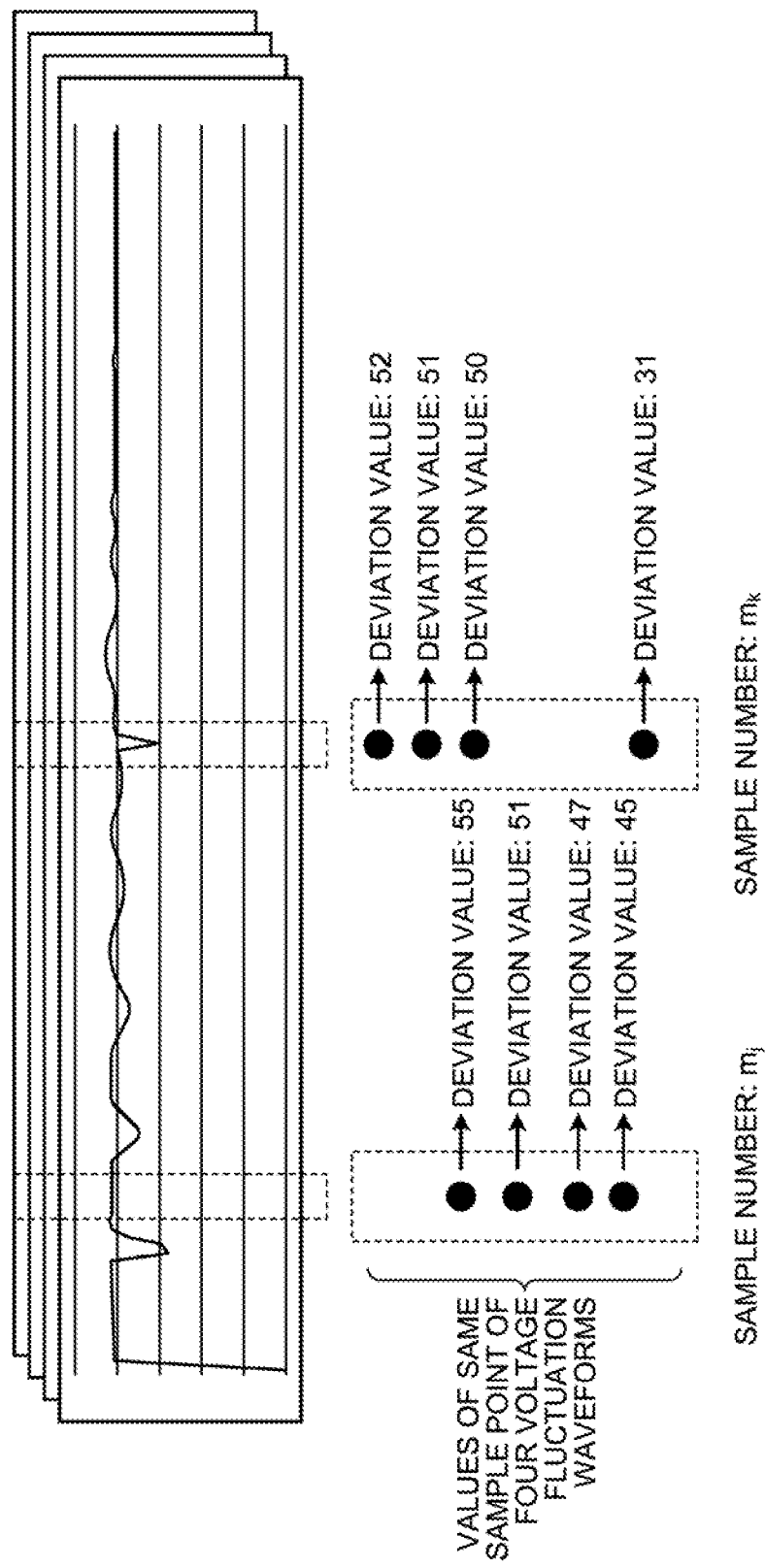
FIG. 10 is a diagram for explaining the operation of a noise removal unit according to the third embodiment.

The noise removal unit 71 obtains deviation values of the values of each sample point of each of the plurality of voltage fluctuation waveforms output from the waveform acquisition unit 11 (see FIG. 10). FIG. 10 is a diagram for explaining the operation of the noise removal unit 71 according to the third embodiment. FIG. 10 illustrates an example in which four voltage fluctuation waveforms are to be processed. In the case of the example of FIG. 10, as there are four voltage values corresponding to one sample point, the noise removal unit 71 obtains the deviation value of each of the four voltage values on a per sample-point basis. In the example illustrated in FIG. 10, the deviation values of the four values of a sample point with a sample number "$m_j$" are 55, 51, 47, and 45, and the deviation values of the four values of a sample point with a sample number "$m_k$" are 52, 51, 50, and 31.

The noise removal unit 71 determines that the voltage value having the deviation value larger than or equal to a first threshold and the voltage value having the deviation value smaller than or equal to a second threshold are impulse noises. The first threshold is larger than the second threshold. The first threshold and the second threshold are determined taking into consideration how much voltage values of the same sample number vary such that the range of the variation of the voltage values of the same sample number falls between the first threshold and the second threshold when the voltage sampling unit 31 repeatedly performs the measurement with the connection of the device to the bus line 3 being maintained in the same state, for example.

In the case of the second example, the noise removal unit 71 averages the voltage values, which are not determined as the impulse noises, on a per sample-point basis, and generates the voltage fluctuation waveform from which the noise component has been removed.

When the first threshold is 57 and the second threshold is 43, for example, the noise removal unit 71 determines that none of the voltage values with the sample number "$m_j$" illustrated in FIG. 10 is the impulse noise, and averages all the voltage values. As for the voltage values with the sample number "$m_k$", the noise removal unit 71 determines that the voltage value with the deviation value of 31 is the impulse noise and excludes, from the averaging, the voltage value with the deviation value of 31.

Note that the voltage fluctuation waveform itself including the voltage value determined as the impulse noise, that is, the values of all the sample points forming the voltage fluctuation waveform including the voltage value determined as the impulse noise may be excluded from the averaging. As another processing method, the voltage value determined to be the impulse noise may be corrected to a voltage value corresponding to the deviation value of 50, and the averaging may be performed using the corrected voltage value.

In the case of the second example, the noise removal unit 71 can remove the influence of the impulse noise to thereby further improve the accuracy of the determination by the connected device count determination unit 12 as compared with the case of the first example.

Third Example

The noise removal unit 71 removes the maximum value and the minimum value from the plurality of values of the sample point of the plurality of voltage fluctuation waveforms output from the waveform acquisition unit 11, averages the voltage values not corresponding to the maximum value or the minimum value, and generate the voltage fluctuation waveform from which the noise component has been removed.

For example, when five voltage fluctuation waveforms are to be processed with five values of a certain sample point being 80, 65, 53, 47, and 45 in descending order, the noise removal unit 71 performs the averaging processing on 65, 53, and 47 while excluding 80 and 45.

In the case of the third example, the noise removal unit 71 can remove the influence of impulse noise by the processing simpler than that of the second example. Moreover, the noise removal unit 71 is easy to design because a criterion used in the processing of removing a value need not be prepared.

Note that although the maximum value and the minimum value are excluded in the present example, the noise removal unit 71 may exclude a certain number of values in order from the largest value and exclude a certain number of values in order from the smallest value. The number of values excluded on the larger value side (a certain number) is set equal to the number of values excluded on the smaller value side, and the certain number is set to be an integer of one or more. For example, the noise removal unit 71 excludes three values in order from the largest value and excludes three values in order from the smallest value.

Fourth Example

The noise removal unit 71 adopts a median value of the plurality of values of a sample point of the plurality of voltage fluctuation waveforms output from the waveform acquisition unit 11, and removes the values other than the median value.

When five voltage fluctuation waveforms are to be processed and five values of a sample point with the sample number "$m_j$" in the voltage fluctuation waveforms are 80, 65, 53, 47, and 45 in descending order, for example, the noise removal unit 71 adopts the value "53" and determines that this value "53" is an $m_j$-th sample value of the voltage fluctuation waveform output to the connected device count determination unit 12. That is, the noise removal unit 71 determines the value "53" is the value of the sample point with sample number "$m_j$".

Note that when the number of voltage fluctuation waveforms to be processed is an even number, the noise removal unit 71 obtains an average value of two central values among a plurality of values of a sample point with the same sample number, and determines the average value to be the value of the voltage fluctuation waveform output to the connected device count determination unit 12. When six voltage fluctuation waveforms are to be processed and six values of a sample point with the sample number "$m_j$" in the voltage fluctuation waveforms are 72, 68, 61, 57, 51, and 47 in descending order, for example, the noise removal unit 71 adopts the values "61" and "57" and outputs an average value of these values, which is 59, to the connected device count determination unit 12 as the value of the sample point with the sample number "$m_j$" of the voltage fluctuation waveform.

Where $x_1, x_2, \ldots, x_{n-1}$ and $x_n$ represent values of a sample point with a certain sample number in the voltage fluctuation waveforms to be processed, the noise removal unit 71 performs processing as expressed by the following expression (1) on the plurality of sample points with the sample number. In expression (1), "n" is a positive integer and represents the total number of voltage fluctuation waveforms repeatedly input from the waveform acquisition unit 11 to the noise removal unit 71. The noise removal unit 71 executes the processing according to expression (1) for each of the sample points with the same sample number, and generates the voltage fluctuation waveform from which the noise component has been removed.

$$\text{Output value of noise removal unit} = \begin{cases} x_{\frac{n+1}{2}} & \text{if } n \text{ is odd} \\ \frac{1}{2} \times \left( x_{\frac{n}{2}} + x_{\frac{n}{2}+1} \right) & \text{if } n \text{ is even} \end{cases} \quad \text{[Formula 1]}$$

In the case of the fourth example, impulse noise and random noise can be removed by the simple processing. Moreover, the noise removal unit 71 is easy to design because a criterion used in the processing of removing a value need not be prepared in advance.

As described above, the unauthorized connection detection apparatus 1b according to the present embodiment includes the noise removal unit 71 that removes the noise component from the voltage fluctuation waveform; thus, the unauthorized connection detection apparatus 1b can determine with high accuracy whether or not a device not permitted to establish connection to the bus line 3 is connected to the bus line 3.

Note that although the example of adding the noise removal unit 71 to the unauthorized connection detection apparatus 1 according to the first embodiment has been described, the noise removal unit 71 may be added to the unauthorized connection detection apparatus 1a according to the second embodiment.

Fourth Embodiment

Figure 11:
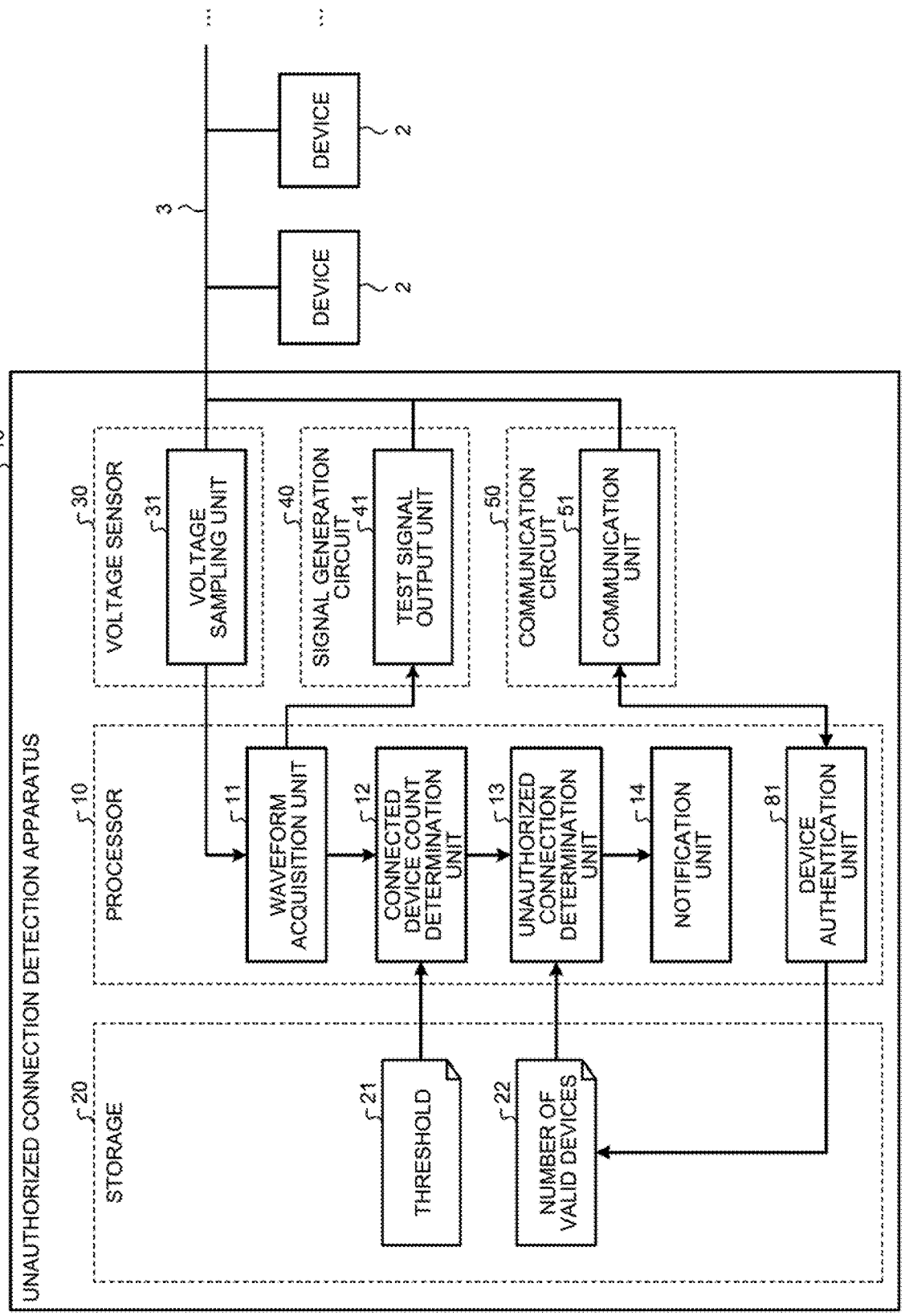
FIG. 11 is a diagram illustrating an example of a functional configuration block of an unauthorized connection detection apparatus according to a fourth embodiment.

FIG. 11 is a diagram illustrating an example of a functional configuration block of an unauthorized connection detection apparatus according to a fourth embodiment. An unauthorized connection detection apparatus 1c according to the fourth embodiment is obtained by adding a device authentication unit 81 to the unauthorized connection detection apparatus 1 according to the first embodiment. Components other than the device authentication unit 81 of the unauthorized connection detection apparatus 1c are the same as the components that are assigned the same reference numerals in the unauthorized connection detection apparatus 1 according to the first embodiment. Therefore, description of the components other than the device authentication unit 81 is omitted.

The device authentication unit 81 is implemented by the processor 10. In other words, the device authentication unit 81 is implemented by the processor 10 reading, from the storage 20, a program for operating as the device authentication unit 81 and executing the program. The program for operating as the device authentication unit 81 may be included in the information processing program for operating as the waveform acquisition unit 11, the connected device count determination unit 12, the unauthorized connection determination unit 13, and the notification unit 14 as described in the first embodiment.

The device authentication unit 81 communicates with a device connected to the bus line 3 and executes authentication processing for determining whether or not the device is a valid device, that is, a device permitted to connect to the bus line 3. For example, the device authentication unit 81 inquires of the device 2 connected to the bus line 3 about identification information on the device and a password for device authentication. The device authentication unit 81 then determines whether or not the device 2 is a valid device by checking whether or not the identification information and password received from the device 2 match identification information and password that are registered in advance. The device authentication unit 81 determines that the device 2 is a valid device when the identification information and password received from the device 2 match the identification information and password registered in advance, thereby updating the number of valid devices 22 held in the storage 20. Specifically, the device authentication unit 81 increases the number of valid devices 22 by one whenever determining that the device 2 connected to the bus line 3 is a valid device.

As described above, the unauthorized connection detection apparatus 1c according to the present embodiment includes the device authentication unit 81 that performs the authentication processing on a device connected to the bus line 3, and thus need not hold in advance the number of valid devices 22 necessary for determining whether or not a device not permitted to establish connection to the bus line 3 is connected to the bus line 3. Moreover, the unauthorized connection detection apparatus 1c can properly determine whether or not a device not permitted to establish connection to the bus line is connected to the bus line 3 even after the number of valid devices connected to the bus line 3 changes.

Fifth Embodiment

Figure 12:
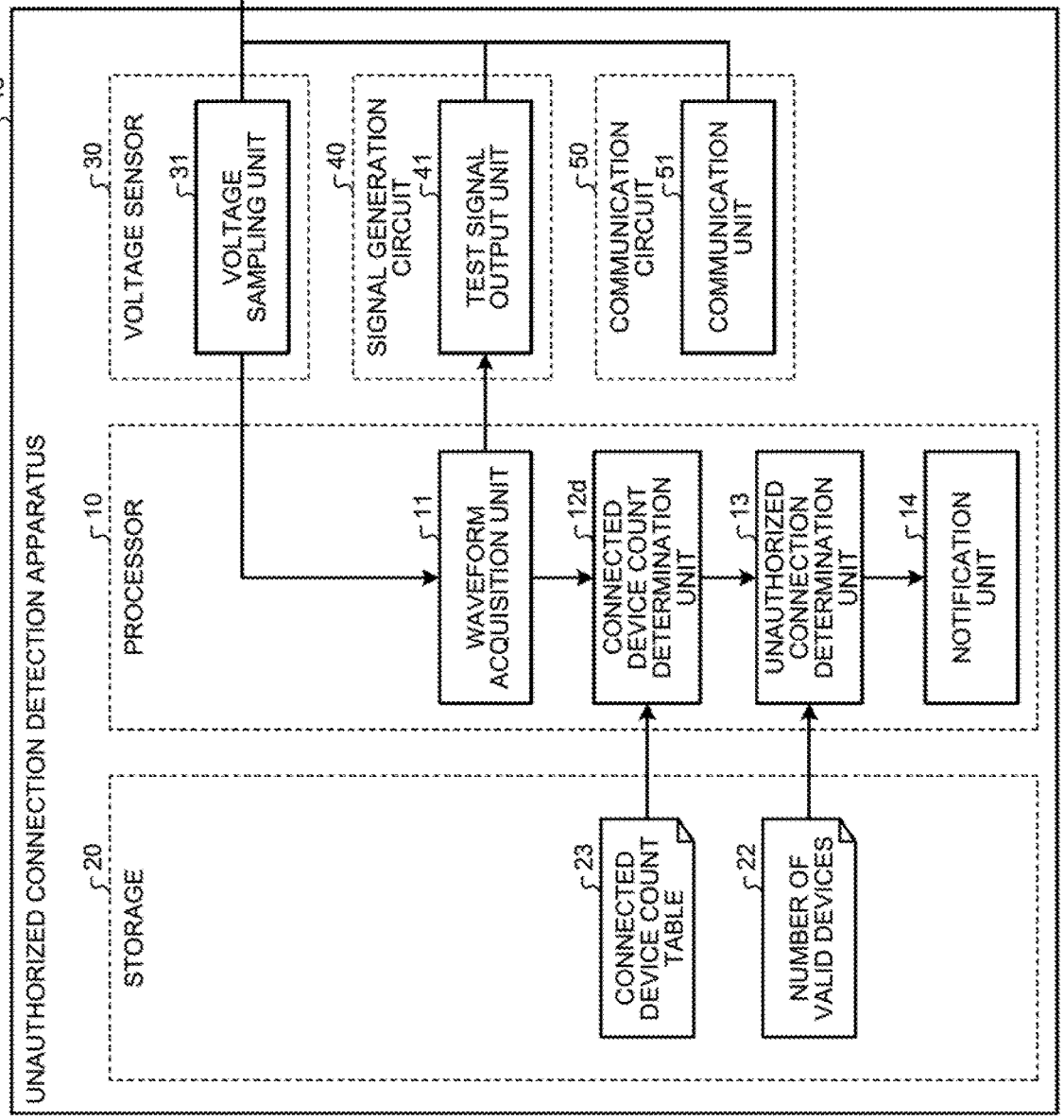
FIG. 12 is a diagram illustrating an example of a functional configuration block of an unauthorized connection detection apparatus according to a fifth embodiment.

FIG. 12 is a diagram illustrating an example of a functional configuration block of an unauthorized connection detection apparatus according to a fifth embodiment. An unauthorized connection detection apparatus 1d according to the fifth embodiment is obtained by replacing the connected device count determination unit 12 of the unauthorized connection detection apparatus 1 according to the first embodiment with a connected device count determination unit 12d. Moreover, the unauthorized connection detection apparatus 1d holds a connected device count table 23. The connected device count table 23 is used when the connected device count determination unit 12d determines the number of devices connected to the bus line 3. Components other than the connected device count determination unit 12d of the unauthorized connection detection apparatus 1d are the same as the components that are assigned the same reference numerals in the unauthorized connection detection apparatus 1 according to the first embodiment. Therefore, description of the components other than the connected device count determination unit 12d is omitted.

The connected device count determination unit 12 described in the first embodiment determines the number of devices connected to the bus line 3 by comparing each sample value forming the voltage fluctuation waveform with the threshold. On the other hand, the connected device count determination unit 12*d* calculates an area of the voltage fluctuation waveform and determines the number of devices connected to the bus line 3 on the basis of the area. The area of the voltage fluctuation waveform decreases as the number of devices connected to the bus line 3 increases; thus, the connected device count determination unit 12*d* uses this property to determine the number of devices connected to the bus line 3.

Figures 13, 14:
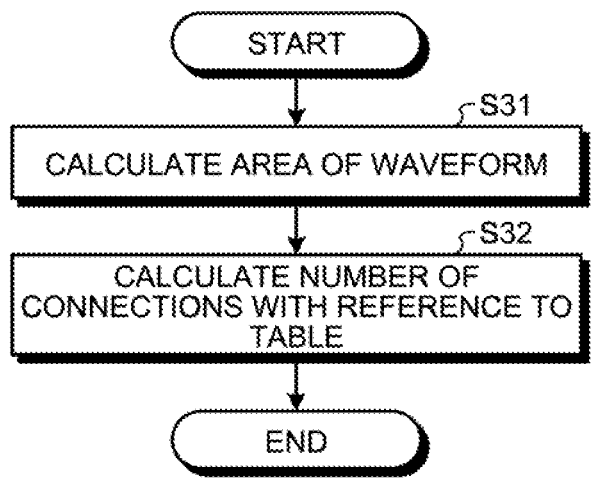
FIG. 13 is a flowchart illustrating an example of the operation of a connected device count determination unit according to the fifth embodiment.
FIG. 14 is a table illustrating an example of a connected device count table used when the connected device count determination unit according to the fifth embodiment derives the number of devices connected to a bus line.

FIG. 13 is a flowchart illustrating an example of the operation of the connected device count determination unit 12*d* according to the fifth embodiment. The connected device count determination unit 12*d* first calculates the area of the voltage fluctuation waveform (step S31). The connected device count determination unit 12*d* may calculate the area of the voltage fluctuation waveform by integrating the sample values measured by the voltage sampling unit 31. Next, the connected device count determination unit 12*d* consults the connected device count table 23 to derive the number of devices connected to the bus line 3 (step S32). The connected device count determination unit 12*d* consults a connected device count table illustrated in FIG. 14, for example, and obtains the number of devices connected to the bus line and corresponding to the area of the voltage fluctuation waveform calculated in step S31.

FIG. 14 is a table illustrating an example of the connected device count table used when the connected device count determination unit 12*d* according to the fifth embodiment derives the number of devices connected to the bus line 3. In the connected device count table illustrated in FIG. 14, a character "A" represents a reference area that is the area of the voltage fluctuation waveform when no device is connected to the bus line 3. A character "S" represents the area of the voltage fluctuation waveform calculated in step S31. A character "P" is a variation parameter (0<P≤1), and a character "Z" is a constant or fixed value representing the amount of influence one device has on the area of the voltage fluctuation waveform. A method of calculating the amount of influence "Z" will be described separately. In the case where the table illustrated in FIG. 14 is used, the connected device count determination unit 12*d* determines that the number of devices connected to the bus line is zero if the area "S" calculated satisfies "(A−Z*P)<S≤A", determines that the number of devices connected to the bus line is one if the area "S" calculated satisfies "(A−2*Z*P)<S≤(A−Z*P)", or determines that the number of devices connected to the bus line is two if the area "S" calculated satisfies "(A−3*Z*P)<S≤(A−2*Z*P)".

FIG. 15 is a diagram for explaining a method of creating the connected device count table illustrated in FIG. 14. For example, the connected device count determination unit 12*d* creates the connected device count table illustrated in FIG. 14 in advance in accordance with the procedure illustrated in FIG. 15. Note that the connected device count table may be created by a unit other than the connected device count determination unit 12*d*.

A connected device characteristic table illustrated in FIG. 15 is a table in which information representing a characteristic of each valid device connected to the bus line 3 is registered. The information representing a characteristic of a valid device can be capacitance, for example. FIG. 15 illustrates an example in which there are three valid devices with the capacitance being the value representing the characteristic thereof, where a device with an identification (ID) "1" has capacitance "X1", a device with an ID "2" has capacitance "X2", and a device with an ID "3" has capacitance "X3". When the number of valid devices connected to the bus line 3 is changed, the connected device characteristic table is changed accordingly. The connected device characteristic table is changed by, for example, a user of the unauthorized connection detection apparatus 1*d* using an information writing tool. The connected device count determination unit 12*d* periodically checks whether or not the connected device characteristic table has been updated and, when having detected an update, executes reference table derivation processing to generate the connected device count table.

In the reference table derivation processing, the connected device count determination unit 12*d* first calculates the amount of above-described influence "Z" in accordance with expression (2), and creates the connected device count table, using the calculated amount of influence "Z". An influence coefficient "Yi" and an area "Ra" corresponding to the characteristic, which are included in expression (2), are obtained in advance by, for example, simulation. The example illustrated in FIG. 15 sets n=3 since the number of valid devices connected to the bus line 3 is three.

$$z = \frac{1}{n} \times \sum_{i}^{n} Xi \times Yi \times Ra \qquad \text{[Formula 2]}$$

Note that the connected device count table may be generated by, for example, an information processor outside the unauthorized connection detection apparatus 1*d*, and written in the unauthorized connection detection apparatus 1*d*.

As described above, the unauthorized connection detection apparatus 1*d* according to the present embodiment determines, on the basis of the area of the voltage fluctuation waveform, the number of devices connected to the bus line 3, and determines, on the basis of the number of devices connected to the bus line 3, whether or not an unauthorized device is connected to the bus line 3. As with the unauthorized connection detection apparatus 1 according to the first embodiment, the unauthorized connection detection apparatus 1*d* can quickly detect that a device not permitted to establish connection to the bus line 3 is connected to the bus line 3, as well as preventing an increase in the processing load. The unauthorized connection detection apparatus 1*d* can also increase resistance to random noise compared to the unauthorized connection detection apparatus 1 according to the first embodiment.

Note that although the description has been made as to the case where the connected device count determination unit 12 of the unauthorized connection detection apparatus 1 according to the first embodiment is replaced with the connected device count determination unit 12*d*, the connected device count determination unit 12*a* of the unauthorized connection detection apparatus 1*a* according to the second embodiment, the connected device count determination unit 12 of the unauthorized connection detection apparatus 1*b* according to the third embodiment, or the connected device count determination unit 12 of the unauthorized connection detection apparatus 1*c* according to the fourth embodiment may be replaced with the connected device count determination unit 12*d*. Where the connected device count determination unit 12*a* of the unauthorized connection detection apparatus 1*a* according to the second embodiment is replaced with the connected device count determination unit 12d, the unauthorized connection detection apparatus 1a prepares and holds a plurality of types of connected device count tables which the connected device count determination unit 12d uses in the processing of deriving the number of devices connected to the bus line 3. Then, among the plurality of types of connected device count tables, the connected device count determination unit 12d uses the connected device count table corresponding to the temperature measured by the temperature measurement unit 61 to execute the processing of deriving the number of devices connected to the bus line 3.

Sixth Embodiment

Figure 16:
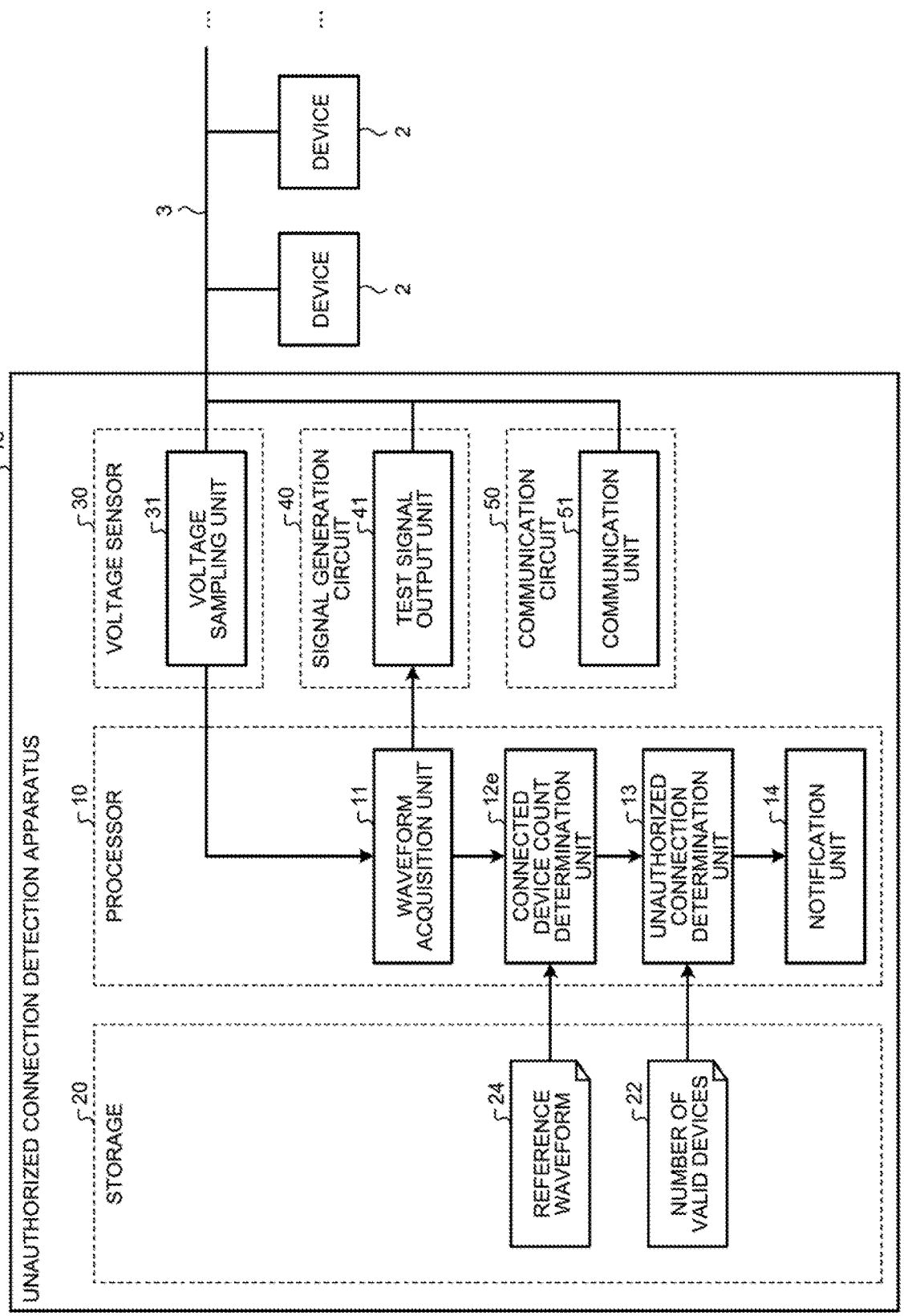
FIG. 16 is a diagram illustrating an example of a functional configuration block of an unauthorized connection detection apparatus according to a sixth embodiment.

FIG. 16 is a diagram illustrating an example of a functional configuration block of an unauthorized connection detection apparatus according to a sixth embodiment. An unauthorized connection detection apparatus 1e according to the sixth embodiment is obtained by replacing the connected device count determination unit 12 of the unauthorized connection detection apparatus 1 according to the first embodiment with a connected device count determination unit 12e. Moreover, the unauthorized connection detection apparatus 1e holds a reference waveform 24. The reference waveform 24 is used when the connected device count determination unit 12e determines the number of devices connected to the bus line 3. Components other than the connected device count determination unit 12e of the unauthorized connection detection apparatus 1e are the same as the components that are assigned the same reference numerals in the unauthorized connection detection apparatus 1 according to the first embodiment. Therefore, description of the components other than the connected device count determination unit 12e is omitted.

The connected device count determination unit 12 described in the first embodiment determines the number of devices connected to the bus line 3, by comparing each sample value forming the voltage fluctuation waveform with the threshold. On the other hand, the connected device count determination unit 12e analyzes the voltage fluctuation waveform and extracts a component of a reflected wave corresponding to each connection point of the device, thereby determining the number of devices connected to the bus line 3. The connected device count determination unit 12e determines the number of devices connected to the bus line 3, by executing processing of searching for a waveform whose difference from the reference waveform 24 is smaller than a predetermined value or a waveform whose difference from a waveform generated from the reference waveform 24 is smaller than a predetermined value.

Figure 17:
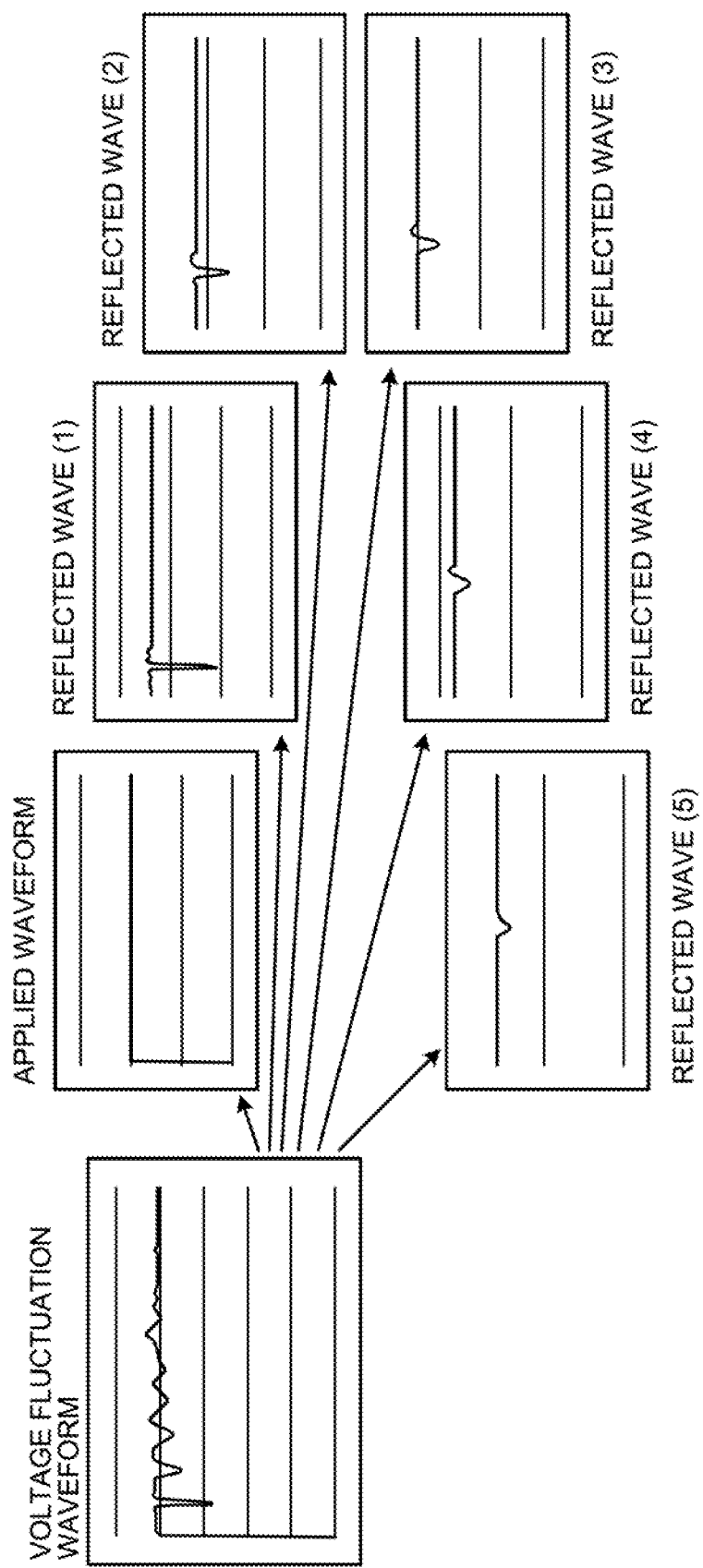
FIG. 17 is a diagram illustrating an overview of the operation of a connected device count determination unit according to the sixth embodiment.

FIG. 17 is a diagram illustrating an overview of the operation of the connected device count determination unit 12e according to the sixth embodiment. The example illustrated in FIG. 17 illustrates an overview of the operation when the number of devices connected to the bus line 3 is five. In the case of the example illustrated in FIG. 17, the connected device count determination unit 12e analyzes the voltage fluctuation waveform to extract components of reflected waves (1) to (5), thereby determining that the number of devices connected to the bus line 3 is five.

Figure 18:
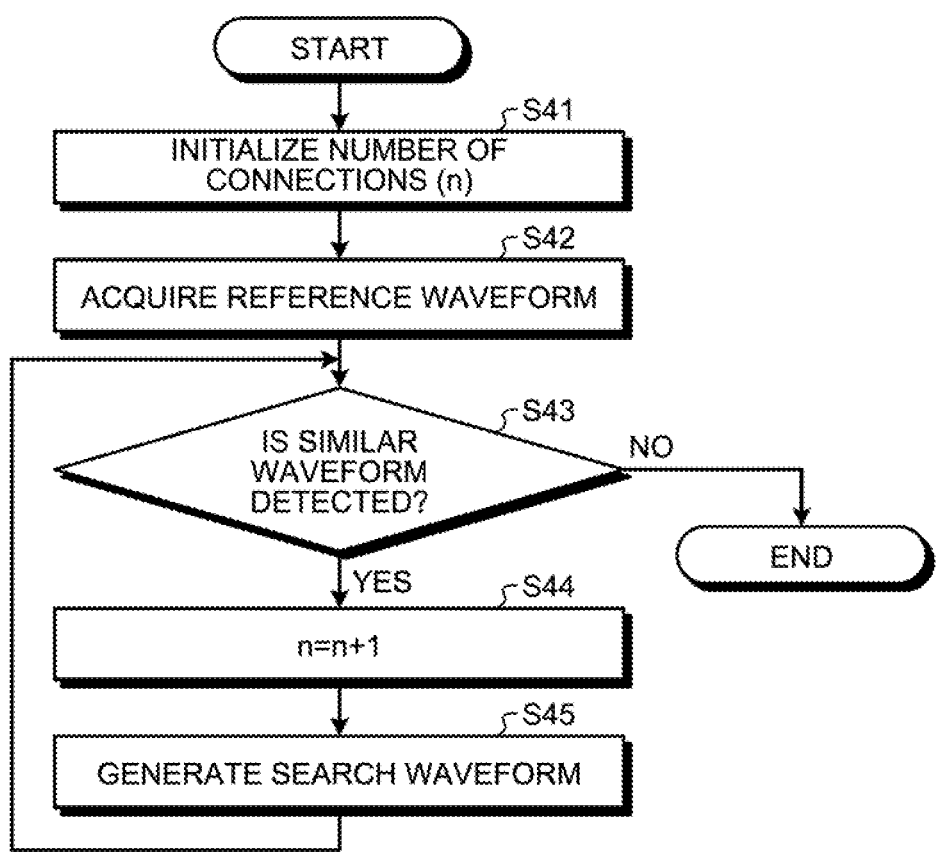
FIG. 18 is a flowchart illustrating an example of the operation of the connected device count determination unit according to the sixth embodiment.

FIG. 18 is a flowchart illustrating an example of the operation of the connected device count determination unit 12e according to the sixth embodiment. The connected device count determination unit 12e starts the operation according to the flowchart illustrated in FIG. 18 once the voltage fluctuation waveform is input.

The connected device count determination unit 12e first initializes the number of connections "n" (step S41) and then acquires the reference waveform 24 (step S42). The connected device count determination unit 12e sets n=0 in step S41. The reference waveform 24 represents the shape of a reflected wave that is detected first by the unauthorized connection detection apparatus 1e. In the case of the example illustrated in FIG. 17, the reflected wave that is detected first by the unauthorized connection detection apparatus 1e is reflected wave (1), and the shape of the reference waveform 24 is similar to the shape of reflected wave (1).

Next, the connected device count determination unit 12e uses the reference waveform 24 as a search waveform and executes processing of detecting a waveform similar to the search waveform by checking whether or not a reflected wave having the waveform similar to the search waveform is included in the voltage fluctuation waveform (step S43). The waveform similar to the search waveform is a waveform whose difference from the search waveform is smaller than a predetermined value.

In step S43, the connected device count determination unit 12e first compares a part of the voltage fluctuation waveform with the search waveform to obtain an absolute value of the difference therebetween. When the search waveform includes sample values (voltage values) that are "L" (positive integer) in number, for example, the connected device count determination unit 12e selects, as targets of comparison, first "L" sample values, that is, a first sample value to an L-th sample value, of a plurality of sample values forming the voltage fluctuation waveform. The first sample value is a sample value measured first among the plurality of sample values, and the L-th sample value is a sample value measured L-th among the plurality of sample values. Then, the connected device count determination unit 12e calculates the absolute values of the differences between the "L" sample values forming the search waveform and the "L" sample values to be compared in order from the first sample values. Moreover, the connected device count determination unit 12e obtains a total value of the absolute values calculated, and sets the total value as the absolute value of the difference between a part of the voltage fluctuation waveform and the search waveform. Next, when the absolute value of the difference between a part of the voltage fluctuation waveform and the search waveform is smaller than a predetermined value, the connected device count determination unit 12e determines that the waveform including the "L" sample values to be compared is similar to the search waveform. When the absolute value of the difference between a part of the voltage fluctuation waveform and the search waveform is larger than or equal to a predetermined value, the connected device count determination unit 12e selects, as the targets of comparison, "L" sample values from a second sample value, that is, the second sample value to an (L+1)-th sample value, of the plurality of sample values forming the voltage fluctuation waveform, thereby obtaining the absolute values of the differences between the "L" sample values forming the search waveform and the "L" sample values to be compared, and checking whether or not a total value of the absolute values obtained is smaller than a predetermined value. The connected device count determination unit 12e repeats similar processing successively until determining that the waveform including the "L" sample values to be compared is similar to the search waveform or until completing the similar processing that is performed by selecting, as the targets of comparison, the last "L" sample values of the plurality of sample values forming the voltage fluctuation waveform.

When the waveform similar to the search waveform is detected, that is, when the waveform similar to the search waveform is included in the voltage fluctuation waveform (Yes in step S43), the connected device count determination unit 12e adds one to "n" (step S44) and generates a search waveform (step S45). The connected device count determination unit 12e then returns to step S43 and uses the search waveform generated in step S45 to execute again the processing of detecting a waveform similar to the search waveform.

Figure 19:
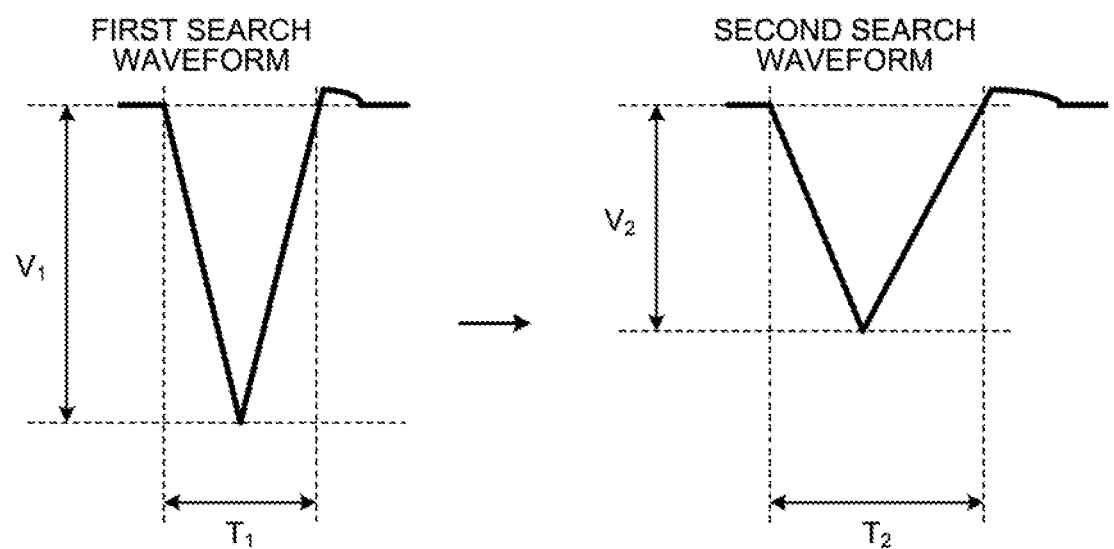
FIG. 19 is a diagram for explaining an operation of generating a search waveform by the connected device count determination unit according to the sixth embodiment.

The operation in which the connected device count determination unit 12e generates the search waveform in step S45 will be described. When the connected device count determination unit 12e detects a reflected wave having a waveform similar to a certain search waveform, a waveform of a reflected wave to be detected next is related to the reflected wave having the waveform detected. For this reason, a search waveform used in the processing of detecting the next reflected wave is also related to the search waveform used in the previous detection processing; thus, the search waveform used in the processing of detecting the next reflected wave can be generated on the basis of the search waveform used in the previous detection processing. For example, in the example illustrated in FIG. 17, reflected wave (1) is detected first, and then reflected wave (2), reflected wave (3), reflected wave (4), and reflected wave (5) are detected in this order. In this case, a search waveform used in the processing of detecting reflected wave (2) (hereinafter referred to as a second search waveform) can be generated on the basis of a search waveform used in the processing of detecting reflected wave (1) (hereinafter referred to as a first search waveform). When the first search waveform and the second search waveform are the ones illustrated in FIG. 19, for example, the connected device count determination unit 12e multiplies a time width $T_1$ and an amplitude $V_1$ of the first search waveform illustrated in FIG. 19 by predetermined coefficients $\alpha$ and $\beta$ to obtain a time width $T_2$ and an amplitude $V_2$ of the second search waveform. Specifically, the connected device count determination unit 12e calculates the time width $T_2$ of the second search waveform in accordance with expression (3), and calculates the amplitude $V_2$ in accordance with expression (4). Note that FIG. 19 is a diagram for explaining the operation of generating the search waveform by the connected device count determination unit 12e according to the sixth embodiment.

$$T_2 = \alpha \times T_1 \quad (3)$$

$$V_2 = \beta \times V_1 \quad (4)$$

The coefficients $\alpha$ and $\beta$ are obtained in advance by performing, for example, a simulation.

Note that although the connected device count determination unit 12e generates the search waveform in step S45 in the present embodiment, if an increase in the amount of data stored in the unauthorized connection detection apparatus 1e causes no problem, a plurality of search waveforms may be calculated in advance and stored in the unauthorized connection detection apparatus 1e. In this case, in step S45, the connected device count determination unit 12e reads, from the storage 20, the search waveform used in the processing of step S43. The processing by the connected device count determination unit 12e can be simplified when the plurality of search waveforms is calculated in advance and stored in the unauthorized connection detection apparatus 1e.

The connected device count determination unit 12e ends the operation when the waveform similar to the search waveform is not detected in step S43, that is, when the waveform similar to the search waveform is not included in the voltage fluctuation waveform (No in step S43). The connected device count determination unit 12e determines that the value of "n" at the time of ending the operation illustrated in FIG. 18, that is, at the time of determining that the waveform similar to the search waveform is not included in the voltage fluctuation waveform is the number of devices connected to the bus line 3.

As described above, the unauthorized connection detection apparatus 1e according to the present embodiment analyzes the voltage fluctuation waveform and detects the reflected wave generated in each device connected to the bus line 3, thereby determining the number of devices connected to the bus line 3. As with the unauthorized connection detection apparatus 1 according to the first embodiment, the unauthorized connection detection apparatus 1e can quickly detect that a device not permitted to establish connection is connected to the bus line 3, as well as preventing an increase in the processing load.

Note that although the description has been made as to the case where the connected device count determination unit 12 of the unauthorized connection detection apparatus 1 according to the first embodiment is replaced with the connected device count determination unit 12e, the connected device count determination unit 12a of the unauthorized connection detection apparatus 1a according to the second embodiment, the connected device count determination unit 12 of the unauthorized connection detection apparatus 1b according to the third embodiment, or the connected device count determination unit 12 of the unauthorized connection detection apparatus 1c according to the fourth embodiment may be replaced with the connected device count determination unit 12e. Where the connected device count determination unit 12a of the unauthorized connection detection apparatus 1a according to the second embodiment is replaced with the connected device count determination unit 12e, the unauthorized connection detection apparatus 1a prepares and holds a plurality of types of reference waveforms which the connected device count determination unit 12e uses in the processing of deriving the number of devices connected to the bus line 3. Then, among the plurality of types of reference waveforms, the connected device count determination unit 12e uses the reference waveform corresponding to the temperature measured by the temperature measurement unit 61 to execute the processing of deriving the number of devices connected to the bus line 3.

The configuration illustrated in the aforementioned embodiment merely illustrates an example of the content of the present invention, and can thus be combined with another known technique or partially omitted and/or modified without departing from the scope of the present invention.

REFERENCE SIGNS LIST 1, 1a, 1b, 1c, 1d, 1e unauthorized connection detection apparatus; 2 device; 3 bus line; 10 processor; 11 waveform acquisition unit; 12, 12a, 12d, 12e connected device count determination unit; 13 unauthorized connection determination unit; 14 notification unit; 20 storage; 21, 21-1, 21-$i$ threshold; 22 number of valid devices; 23 connected device count table; 24 reference waveform; 30 voltage sensor; 31 voltage sampling unit; 40 signal generation circuit; 41 test signal output unit; 50 communication circuit; 51 communication unit; 60 temperature sensor; 61 temperature measurement unit; 71 noise removal unit; 81 device authentication unit; 100 network system.

The invention claimed is:

1. An unauthorized connection detection apparatus comprising:
    a hardware configuration comprising a storage and a processor,
    wherein the processor is configured to:
        determine the number of devices connected to a bus line in response to a measured waveform that is a voltage fluctuation waveform representing a change over time in a voltage value of the bus line or an impedance fluctuation waveform representing a change over time in an impedance value of the bus line; and
        determine whether or not an unauthorized device is connected to the bus line in response to: a result of the determination of the number of devices; and information indicating the number of valid devices connected to the bus line.

2. The unauthorized connection detection apparatus according to claim 1, wherein the processor is further configured to:
    compare a plurality of sample values forming the measured waveform with a threshold to obtain the number of peak values exceeding the threshold, and determine that the obtained number of peak values is the number of devices connected to the bus line.

3. The unauthorized connection detection apparatus according to claim 1, wherein the processor is further configured to:
    calculate an area of the measured waveform and determine the number of devices connected to the bus line in response to the calculated area.

4. The unauthorized connection detection apparatus according to claim 1, wherein the processor is further configured to:
    repeatedly execute processing of extracting, from the measured waveform, a component of a reflected wave generated at a connection point of a device connected to the bus line, and determine that the number of the components of the reflected waves extracted is the number of devices connected to the bus line.

5. The unauthorized connection detection apparatus according to claim 1, wherein the processor is further configured to:
    remove a noise component included in the measured waveform; and
    determine the number of devices connected to the bus line, in response to the measured waveform obtained after the noise component is removed.

6. The unauthorized connection detection apparatus according to claim 5, wherein the processor is further configured to:
    average the measured waveforms acquired over a plurality of times and determine the number of devices connected to the bus line in response to the averaged waveform.

7. The unauthorized connection detection apparatus according to claim 5, wherein the processor is further configured to:
    calculate a deviation value of a sample value of each of the measured waveforms acquired over a plurality of times, exclude from a processing target the sample value having the calculated deviation value larger than or equal to a first threshold and the sample value having the calculated deviation value smaller than or equal to a second threshold that is smaller than the first threshold, calculate an average value of the remaining sample values with the same sample number, and determine the number of devices connected to the bus line in response to the average value.

8. The unauthorized connection detection apparatus according to claim 5, wherein the processor is further configured to:
    exclude, from a processing target, a certain number of sample values in descending order of values and a certain number of sample values in ascending order of values for each of the measured waveforms acquired over a plurality of times, calculate an average value of remaining sample values with the same sample number, and determine the number of devices connected to the bus line in response to the average value.

9. The unauthorized connection detection apparatus according to claim 5, wherein the processor is further configured to:
    obtain a median value of sample values with the same sample number of the measured waveforms acquired over a plurality of times, and determine the number of devices connected to the bus line in response to the median value for each sample number.

10. The unauthorized connection detection apparatus according to claim 9, wherein the processor is further configured to:
    when the number of the measured waveforms acquired over the plurality of times is an odd number, select one sample value in the center of values arranged in descending order from among the sample values with the same sample number, and determine that the one sample value is the median value, or, when the number of the measured waveforms acquired over the plurality of times is an even number, select two sample values in the center of values arranged in descending order from among the sample values with the same sample number, and determine that an average value of the selected two sample values is the median value.

11. The unauthorized connection detection apparatus according to claim 2, further comprising:
    a temperature sensor, wherein:
    the processor is further configured to determine the number of devices connected to the bus line, using a threshold corresponding to a result of measurement by the temperature sensor among a plurality of the thresholds.

12. The unauthorized connection detection apparatus according to claim 2, wherein the processor is further configured to:
    when it is determined that an unauthorized device is not connected to the bus line, generate information related to a connection position of a valid device and store the generated information in the storage in response to a result of the comparison between the plurality of sample values forming the measured waveform and the threshold; and
    when it is afterward determined that an unauthorized device is connected to the bus line, identify a connection position of the unauthorized device in response to: the result of the comparison between the plurality of sample values forming the measured waveform and the threshold; and the information related to the connection position of the valid device.

13. The unauthorized connection detection apparatus according to claim 1, wherein the processor is further configured to:
notify, to an outside, a result of determination whether or not the unauthorized device is connected to the bus line.

14. The unauthorized connection detection apparatus according to claim 1, wherein the processor is further configured to:
execute authentication processing of determining whether or not a device connected to the bus line is a valid device, and update information indicating the number of the valid devices when it is determined that the device is the valid device.

15. An unauthorized connection detection method comprising:
determining the number of devices connected to a bus line in response to a measured waveform that is a voltage fluctuation waveform representing a change over time in a voltage value of the bus line or an impedance fluctuation waveform representing a change over time in an impedance value of the bus line; and
determining whether or not an unauthorized device is connected to the bus line in response to: a result of the determination of the number of devices; and information indicating the number of valid devices connected to the bus line.

16. A non-transitory computer-readable medium storing an information processing program that causes a computer to execute:
determining the number of devices connected to a bus line in response to a measured waveform that is a voltage fluctuation waveform representing a change over time in a voltage value of the bus line or an impedance fluctuation waveform representing a change over time in an impedance value of the bus line; and
determining whether or not an unauthorized device is connected to the bus line in response to: a result of the determination of the number of devices; and information indicating the number of valid devices connected to the bus line.

* * * * *